United States Patent [19]

Hirosawa et al.

[11] Patent Number: 5,404,541
[45] Date of Patent: Apr. 4, 1995

[54] OPERATION MONITORING AND CONTROLLING APPARATUS FOR COMPUTER SYSTEM

[75] Inventors: Toshio Hirosawa, Machida; Jun'ichi Kurihara, Mitaka, both of Japan

[73] Assignee: Hitachi, Ltd., Tokyo, Japan

[21] Appl. No.: 237,756

[22] Filed: Aug. 29, 1988

[30] Foreign Application Priority Data

Aug. 28, 1987 [JP] Japan .................. 62-212754

[51] Int. Cl.⁶ .................. G06F 9/00; G06F 13/00
[52] U.S. Cl. .................. 395/750; 395/325;
364/921.9; 364/940.68; 364/948.4; 364/DIG. 2
[58] Field of Search ... 364/200 MS File, 900 MS File,
364/464, 483, 492, 707, 484, 486, 488; 340/310
A, 310 R, 309.41, 825.06; 307/39, 40, 41;
370/85; 395/325, 750

[56] References Cited

U.S. PATENT DOCUMENTS

| | | | |
|---|---|---|---|
| 4,051,326 | 9/1977 | Badagnani et al. | 364/900 |
| 4,206,444 | 6/1980 | Ferlan | 346/147 R |
| 4,521,869 | 6/1985 | Moss et al. | 364/900 |
| 4,540,890 | 9/1985 | Gangemi et al. | 340/310 A |
| 4,593,349 | 6/1986 | Chase et al. | 364/200 |
| 4,607,330 | 8/1986 | McMurray et al. | 364/200 |
| 4,611,289 | 9/1986 | Coppola | 364/200 |
| 4,677,566 | 6/1987 | Whittaker et al. | 364/200 |
| 4,698,748 | 10/1987 | Juzswik et al. | 364/200 |
| 4,718,007 | 1/1988 | Yukino | 364/200 |
| 4,723,269 | 2/1988 | Summerlin | 379/102 |
| 4,747,041 | 5/1988 | Engel et al. | 364/200 |
| 4,809,163 | 2/1989 | Hirosawa et al. | 364/200 |
| 5,051,720 | 9/1991 | Kittirutsunetorn | 340/310 R |

FOREIGN PATENT DOCUMENTS

| | | |
|---|---|---|
| 52-11819 | 7/1975 | Japan . |
| 55-53764 | 4/1980 | Japan . |
| 55-121518 | 9/1980 | Japan . |
| 56-92617 | 7/1981 | Japan . |
| 58-107928 | 6/1983 | Japan . |
| 58-184623 | 10/1983 | Japan . |
| 59-212930 | 12/1984 | Japan . |
| 60-5366 | 1/1985 | Japan . |
| 61-165118 | 7/1986 | Japan . |
| 61-188611 | 8/1986 | Japan . |
| 61-253523 | 11/1986 | Japan . |
| 62-12333 | 1/1987 | Japan . |
| 62-65119 | 3/1987 | Japan . |
| 62-198949 | 9/1987 | Japan . |
| 62-202219 | 9/1987 | Japan . |
| 63-53622 | 3/1988 | Japan . |

*Primary Examiner*—Parshotam S. Lall
*Assistant Examiner*—Ayni Mohamed
*Attorney, Agent, or Firm*—Antonelli, Terry, Stout & Kraus

[57] ABSTRACT

An operation monitoring and controlling apparatus for a computer system consisting of a central processing unit, input/output devices, terminals, and a service processor connected to the central processing unit, and including a supervising device for supervising the status of use of the input/output devices and the terminals; a first control device for putting the power supply of the central processing unit either in an on-state or in an off-state; a device for sending a data stream of operator commands, which an operator has inputted, to the service processor; and a second control device, to which a power-off instruction or a power-on instruction, which the operator has inputted is sent the second control device responding to a signal from the supervising device, generating a data stream of operator commands for starting an operating system running under the computer system, which is supplied to the service processor, at the same time generating a power-on signal, which is supplied to the first control device, or generating automatically a data stream of operator commands for stopping the operating system, which is sent to the service processor, and generating a power-off instruction for the first control device, which is supplied to the first control device.

32 Claims, 16 Drawing Sheets

CTERM ----- NUMBER OF TERMINALS IN RUNNING

NTERM ----- NUMBER OF TERMINALS WITHIN SUBCENTER

CDEV ----- NUMBER OF PERIPHERAL DEVICES IN RUNNING

NDEV ----- NUMBER OF PERIPHERAL DEVICES WITHIN SUBCENTER

FIG. 14

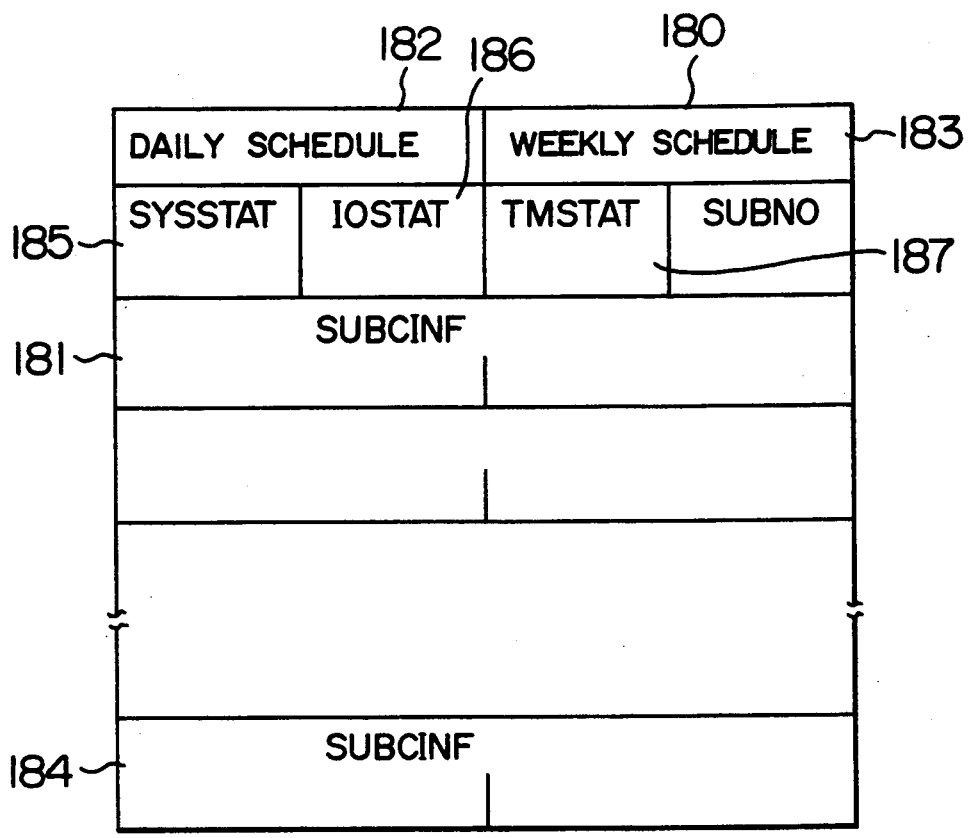

SYSSTAT : STATUS OF COMPUTER SYSTEM
   STOP --- SYSTEM IN STOP STATE
   IPL --- SYSTEM IN STARTING
   RUN --- IN RUNNING
   TERM --- SYSTEM IN TERMINATION PROCESSING

IOSTAT : STATUS OF GROUPS OF INPUT/OUTPUT DEVICES
   STOP --- ALL PERIPHERAL DEVICES IN STOP STATE
   RUN --- EITHER ONE OF PERIPHERAL DEVICES IN RUNNING

TMSTAT : STATUS OF GROUPS OF TERMINALS
   STOP --- ALL TERMINALS IN STOP STATE
   RUN --- EITHER ONE OF TERMINALS IN RUNNING

SUBNO : NUMBER OF SUBCENTERS

SUBCINF : SUBCENTER INFORMATION (REFER TO FIG. 5)

OPERATION MONITORING AND CONTROLLING APPARATUS FOR COMPUTER SYSTEM

BACKGROUND OF THE INVENTION

This invention relates to an operation monitoring and controlling apparatus for a computer system and in particular to an operation monitoring and controlling apparatus capable of operating a computer system without an operator and at the same time suitable for reducing consumed electric power.

As the construction of a computer system is enlarged and becomes more complicated, it becomes necessary to drive it with a high efficiency (saved power operation) by reducing consumed electric power. Concretely speaking, it is desirable to perform a saved power operation by switching-off the power supply for terminals or peripheral devices which are not being used, or by stopping automatically the computer system during the midnight time zone or on a holiday, etc., where the load of the computer system is lowered, and by starting the system automatically, when a user desires to use the computer system thereafter.

As such a prior art apparatus, a mutually monitoring and controlling apparatus for mutually starting computer systems having a network structure is disclosed in JP-A-55-53764. Further, as described in JP-A-60-5366, a controlling apparatus for driving small scale computers without operator is disclosed, in which power source switch-on commands are sent from a host computer to the small scale computers through communication lines, in a hierarchical connection of a network organization consisting of the host computer and the external devices (e.g. small scale computers). Further, another controlling apparatus, which starts/stops a computer system, depending on the power on/off status of terminal devices, has been filed by the same applicants and disclosed in JP-A-59-212930 (corresponding to U.S. patent application Ser. No. 38,307, filed on Apr. 14, 1987, now U.S. Pat. No. 4,809,163, issued Feb. 28, 1989, which is a continuation application of U.S. patent appln. Ser. No. 610,491, filed on May 16, 1984, now abandoned).

Concerning the prior art techniques described above, JP-A-55-53764 has an object to mutually start/stop as well as mutually monitor computer systems having a computer network structure. However, nothing is mentioned about the operation at the moment, where it is required to drive a partner computer, and no effect can be obtained by saved power operation of the computer system, and more concretely by on/off control of the power supply for the whole computer system. That is, it is premised that either one of the computer systems in the computer network structure is necessarily working and the start/stop control is effected by the computer system. Further, nothing is disclosed there about the power supply on/off control for groups of peripheral devices including terminals.

The apparatus disclosed in JP-A-60-5366 effects automatically the power supply on/off control for small scale computers according to instructions from the host computer, when the host computer and the small scale computers are connected hierarchically, forming a network structure, and therefore the host computer has the initiative.

In the apparatus disclosed in JP-A-59-212930 a mechanism for monitoring the power on/off status for each of the terminal devices is incorporated in a terminal controlling device and a control circuit in the power supplying section within the main part of the computer controls start/stop operation of the computer system on the basis of results of the monitoring. Consequently, the power supply on/off control and the start/stop operation of the system are effected, completely following the power on/off status for the groups of terminal devices. Therefore, a remarkable effect can be obtained, in the case where the job, which is running within the computer system, corresponds to the terminals.

However, in a usual calculation center, apart from the job corresponding to the terminals, (TSS (time sharing system), on-line processing programs, etc.), batch processing jobs are also running. Consequently, for the apparatus disclosed in JP-A-59-212930 the following items should be taken into account:

(1) To provide a control method giving rise to no contradictions to operations by an operator of the computer system;
(2) To provide a method for dealing with the power supply, when a user has forgotten to switch-off the power supply of a terminal device;
(3) To provide a control method for saved power operation of groups of devices other than the terminal devices; and
(4) To provide a power supply on/off control method for the computer system in a state of waiting for job execution.

On the other hand, as the scope of utilization of computer systems is enlarged, it is desirable for users to be able to use them at any time when they desire. In this case it is preferable to try to reduce consumed electric power, when the load of the systems is low such as during the midnight time zone, etc., by stopping some of a plurality of processor groups, stopping automatically unnecessary groups of peripheral devices (including terminal devices) and stopping eventually air conditioning equipments therefor, and when the load becomes higher, the groups of devices including processors may be started automatically.

If these operations are effected by an operator of the computer system, it opposes the trend of the reduction of labor for the computer system operation.

On the other hand, when an operator wishes to operate the computer system, it should be always possible.

SUMMARY OF THE INVENTION

An object of this invention is therefore to provide an operation monitoring and controlling apparatus, which, while always monitoring always the behavior of the computer system and the behavior of the users of the terminals, switches off automatically the power supplies of the groups of terminals and peripheral devices which are not used, or stops automatically the computer system or the air conditioning equipment by switching-off the power supplies therefor, or inversely, if need be, switches-on the power supplies of the processor, the groups of terminals and peripheral devices to start them, and at the same time a control method therefor, which doesn't impair the operability by the operator.

Another object of this invention is to provide an operation monitoring system for a computer system capable of performing a saved power operation, depending on the behavior of the users of the computer system.

The above objects can be achieved by disposing a distributed supervision controller according to this invention for every assembly of groups of devices and more concretely for every floor in a building, which connects a power supply unit and a power-off demanding sensor with each of the groups of terminals and a remote power controller with each of the groups of peripheral devices. A centralized supervision controller is disposed in the central main part of the computer system, the centralized supervision controller and the distributed supervision controllers being connected through communication lines. Consequently the operation monitoring and controlling method for the computer system is realized by a centralized supervision controller and at least one distributed supervision controller. Naturally there can exist a plurality of distributed supervision controllers.

A distributed supervision constantly supervises the situation of use of a group of terminals and a group of peripheral devices. Since there remains a possibility that the power supply is switched-on for a terminal, although it is not used, the power supply for the power supply unit for the terminal is switched-off at this time. The power supply to the terminal is started, when a user sits down in front of the console of the terminal and a sensor senses this status or when a signal excited by the power-on demand switch is sent to the distributed supervision controller. The distributed supervision controller examines whether power is already supplied to the terminal or not and if it is not yet supplied thereto, the distributed supervision controller begins to supply power to the terminal by driving a relay circuit in the power supply unit.

On the other hand the switching-on/off of the power supply for a group of peripheral devices such as magnetic tape devices, line printer devices, etc. is effected by registering the wish of the user to use the group of devices in the distributed supervision controller. In this way the distributed supervision controller issues a power-on instruction for the relevant peripheral device to the remote power controller, which sends a power-on signal to the peripheral device.

When the state of the groups of devices under the control of a distributed supervision controller varies, the distributed supervision controller informs the centralized supervision controller thereof through a communication line. When the centralized supervision device receives a report from the distributed supervision controller that the power supplies for all the groups of peripheral devices and terminals are switched off, it examines whether there exist jobs which are in course of execution or waiting for execution in the computer system. This can be done by generating automatically a data stream of operator commands and sending it automatically to the computer system. When it is judged that there exist no jobs, a termination command of the operating system is generated and inputted.

When the operating system is terminated, the power supplies for the computer and the air conditioner are switched off. On the other hand, for the starting of the computer system, it is the moment therefor that a report is received from the distributed supervision controller that one of the terminals or peripheral devices is powered on.

At this time the centralized supervision controller examines whether the power supply of the computer system is switched on or off. If it is switched off, the power supplies for the air conditioner and the computer are switched on and then the data stream of operator commands is generated automatically for the initialization processing of the operating system and inputted.

Further, since the centralized supervision controller is provided with a keyboard/display device, if the operator inputs an operator command through the keyboard, the operability of the prior art techniques is not impaired by using the apparatus according to this invention.

As stated above, a saved power operation of the computer system by controlling the operation without an operator can be achieved.

The operation monitoring and controlling apparatus for a computer system according to this invention consists of a centralized supervision controller and distributed supervision controllers and the centralized supervision controller judges whether the computer system including the air conditioning equipment should be powered-on or off on the basis of a report from the distributed supervision controllers to execute it. Further, since the groups of control devices constituting the operation monitoring and controlling apparatus according to this invention are constituted by adopting a method by which external devices are added to groups of devices constituting a conventional computer system, erroneous operations don't increase with respect to those of conventional computers and groups of peripheral devices. Further, since the centralized supervision controller according to this invention is provided also with a keyboard/display device for the operator of the computer system, the operability is not impaired by using the apparatus according to this invention.

BRIEF DESCRIPTION OF THE DRAWINGS

FIG. 14 is a scheme illustrating the structure of a master control table;

DESCRIPTION OF THE PREFERRED EMBODIMENTS

Hereinbelow an embodiment of this invention, referring to FIGS. 1 to 19.

Figure 1:
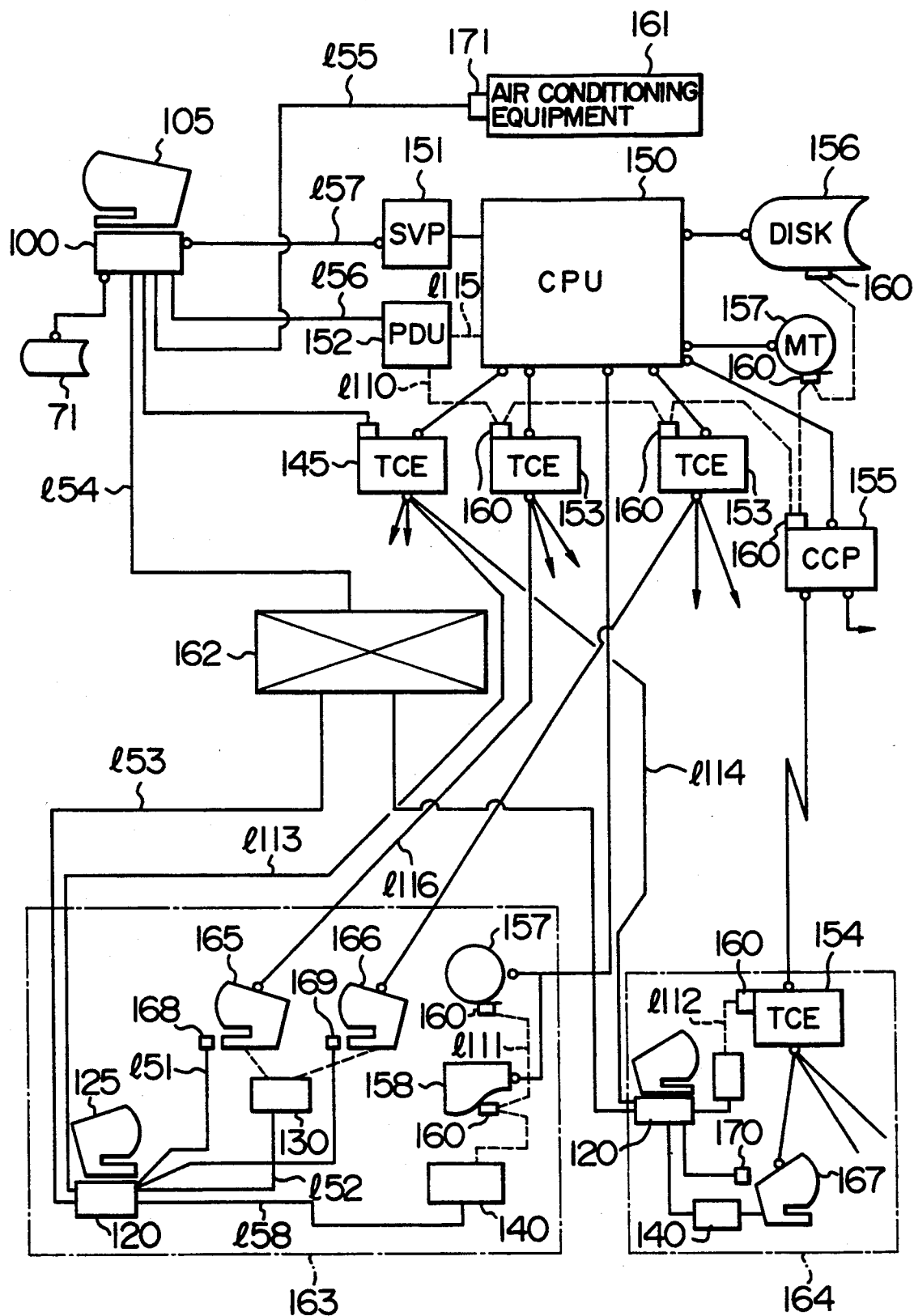
FIG. 1 is a block diagram showing straight-forwardly the operation monitoring and controlling apparatus according to this invention.

FIG. 1 is a block diagram showing straight-forwardly the operation monitoring and controlling apparatus according to this invention. In FIG. 1, reference numeral 100 is a centralized supervision controller according to this invention; reference numeral 120 is a distributed supervision controller; reference numeral 130 is a power supply unit according to this invention; and reference numeral 140 is a remote power controller according to this invention. The centralized supervision controller 100 is connected to a keyboard/display device 105 by means of a keyboard on which an operator can input operator commands. Reference numeral 150 is the central processing unit (CPU) of the computer system; reference numeral 152 is the power supply device unit (PDU) of the CPU 150; reference numerals 153 and 154 are terminal control equipment devices (TCE); reference numeral 155 is a communication control processor (CCP); reference numeral 156 is a magnetic disk device; reference numeral 157 is a magnetic tape device; and reference numeral 158 is a line printer device. Each of the groups of peripheral devices indicated by the reference numerals 153 to 158 is provided independently with a power supply 160, which is controlled through control lines 1110, 1111, 1112, etc.

Reference numeral 161 represents air conditioning equipment and reference numeral 162 indicates a private branch exchanger (PBX). Although, in FIG. 1, the centralized supervision controller 100 and the distributed supervision controllers 120 are connected through the private branch exchanger 162, they can be connected in other ways without any functional differences.

In FIG. 1 an example is shown in which buildings and floors are separated from each other and groups of peripheral devices are disposed therein. In FIG. 1 they are indicated as subcenters 163 and 164, in each of which there exists a distributed supervision controller 120. In this indicated example terminals 165, 166 and 167 are disposed in each of these subcenters. For the subcenter 164 an example is shown in which the terminal 167 is connected with the CCP 155 in the computer room through a communication line and the TCE 154. Further, as it is seen clearly from FIG. 1, a plurality of terminals are connected with each of the terminal control equipments TCE 153 and 154.

Although the computer system in FIG. 1 is constituted by one central processing unit (called also processor) 150, in the operation monitoring and controlling method according to this invention the number of central processing units is not restricted.

The distributed supervision controllers 120 are connected with the TCE 145 through signal lines 1113 and 1114 and these distributed supervision controllers 120 are provided with an auxiliary console function. Further, although in the example indicated in FIG. 1, the distributed supervision controllers 120 are connected with an exclusively used TCE 145, they may be connected with another TCE 153 together with usual terminals.

Now the outline of the operation of the monitoring and controlling apparatus for the computer system according to this invention will be explained, referring to FIG. 1 and the construction and the working mode of the groups of the devices constituting this invention will be explained, referring to FIG. 2 and the following.

Referring to FIG. 1, the distributed supervision controller 120 continuously monitors the status of use of the terminals 165, 166 and the peripheral devices 158, 160. Sensors 168 to 170, etc. are disposed in proximity to the terminal console for the groups of terminals and when the user sits in front of one of the terminals, the distributed supervision controller 120 is informed thereof through the signal line 1 51. This signal is a level signal and as far as the user sits there, the state "1" is reported. The report signal of the state "1" means a terminal use demand, which is not restricted to be generated by a sensor, but may be generated by a power-on demand switch for the terminal. Further a circuit, which is coupled with the power on/off switch in the terminal and from which a signal '1' is taken out when it is switched-on, may be added to the terminal device and the signal may be sent to the signal line 151. Hereinbelow the embodiment of this invention will be explained for the case where the sensors 168 to 170 are used.

At first the distributed supervision controller 120 examines the power-on/off status of the terminal at that point of time. If the signal coming from the signal line 151 is '1' and the power supply for the terminal is in the off-state, it issues an instruction to start the power supply to the terminal 165 to the power supply unit 130 through the signal line 152. In this way the power supply unit 130 begins to supply power to the relevant terminal.

In this way the automatic power supply to the terminal 165 is turned on, but there is a possibility that the computer system has been already stopped and the power supply thereof is in the off-state. Therefore, the distributed supervision controller 120 informs the centralized supervision controller 100 of the fact that the power supply for the terminal 165 has been switched-on.

The centralized supervision controller 100 examines whether the computer system is in operation, when it receives the report from the distributed supervision controller 120. If it is a report that the power supply of the terminal is in the on-state and that the computer system is already in operation, since the terminal 165 can utilize the computer system, no more operation is required.

On the other hand, if the computer system is stopped, the centralized supervision controller 100 drives the air conditioning equipment 161. This is done by driving the power supply unit 171 through the signal line 155. Then, in order to put the central processing unit CPU 150 and power supplies for the groups of input/outputting devices 145, 153, 155–157 in the on-state, it issues a power-on instruction to the power supply device unit PDU 152 through the signal line 156. The supply device unit PDU 152 issues a power-on instruction to the power source devices 160 for the group of input/outputting devices by means of a power supply control line 1110 and at the same time begins to supply power to the central processing unit 150 through a power supply line 1115.

When the central processing unit CPU 150 and the power supplies for the group of input/outputting devices are put in the on-state, then the centralized supervision controller 100 starts an initialization processing of the operating system. Further, the power supply for a service processor SVP 151 is coupled with the central processing unit CPU 150, when the power supply for the central processing unit CPU 150 is in the on-state, the service processor SVP 151 is also automatically powered-on. Here the initialization processing of the operating system is described separately for each of the items, as follows:

(1) To load the principal part of the operating system from a DISK 156 to the main memory within the CPU 150;
(2) To load groups of programs, the principal part of which is necessary for the operation of the whole operating system, from the DISK 156 to the main memory one after another;
(3) To make the running possible by setting values in control tables, etc.;
(4) To start TSS or on-line programs, etc.;
(5) To initialize the reception job queue for making batch processing jobs run; and
(6) To put files, in which statistical information, accounting information, etc. are stored, in a usable state.

In the case where the operation monitoring and controlling method according to this invention is not applied, an operator should input commands for initializing the operating system (called operator commands) one after another by means of the main console (not shown in the figure) connected with the service processor SVP 151. On the contrary, by the control method according to this invention, the centralized supervision controller 100 is connected with the service processor SVP 151 through the signal line 157. This centralized supervision controller 100 starts the initialization processing of the operating system by generating automatically a data stream of commands and by sending them to the service processor SVP 151 through the signal line 157. Further, in the case where the operator wishes to control the computer system, a keyboard/display device 105 connected with the centralized supervision controller 100 according to this invention may be used. This processing method for control used for operation by an operator in common will be explained later, referring to FIG. 12 and the followings. Concerning the details of the operator command, refer to the following materials published by Hitachi Co. Ltd. in Japan;

(1) VOS 3/ES System Operation—Vol. JSS 3 - Version 50 Material No. 8091-9-009, PP. 152–157 and PP. 213–215,
(2) VOS 3/ES System Operation—Vol. JSS 4 - Version 50 Material No. 8091-9-012.

As it can be seen clearly from FIG. 1, the centralized supervision controller 100 is provided with a display device 105 and a keyboard device and works also as a usual main console. Consequently, since the service processor SVP 151 of the computer system acts as if it effected exchange of data with the usual main console, it doesn't disturb the conventional operation.

When the initialization processing of the operating system is terminated, the user of the terminal 165 can use the computer system. On the other hand, in the case where the user wishes to use the magnetic tape device 157 and the line printer device 158, he may declare the use thereof to the distributed supervision controller 120. The distributed supervision controller 120 is provided with a display device 125 and a keyboard device just as the centralized supervision controller 100.

When the distributed supervision controller 120 receives a use demand from the user, it issues a power-on instruction for the relevant device to the remote power controller 140 through the signal line 158. The power source device 160 is driven by the fact that the remote power controller 140 issues a power-on instruction for the relevant device to the power supply control line 1111 and for example the power supply for the magnetic tape device 157 is put in the on-state.

Then the distributed supervision controller 120 informs the centralized supervision controller 100 through the signal lines 153 and 154 just as in the power-on operation for the group of terminals. The centralized supervision controller 100 puts the power supply of the computer system in the on-state at needs and initializes the operating system.

If the initialization of the operating system is terminated or if the computer system is driven, since the distributed supervision controller 120 has the function of an auxiliary console, a data stream of the operator command;

VARY CUU ONLINE is generated automatically and sent through the signal line 1113, in order that the operating system can use logically the relevant device 157, etc.

In this way the group of peripheral devices becomes usable for the user. When the use of the relevant device is terminated, a data stream of the operator command;

VARY CUU OFFLINE for separating the relevant device from the operating system is generated automatically by the distributed supervision controller 120 and sent through the signal line 1113. Concerning the details of these commands, refer to the aforementioned publications. Thereafter the distributed supervision controller 120 issues a power-off instruction for the relevant device to the remote power controller 140 through the signal line 158. The power supply device 160 is driven so that the relevant device is powered-off by the fact that the remote power controller 140 issues a power-off instruction for the relevant device to the power supply control line 1111.

As explained above, the group of peripheral devices such as the magnetic tape device 157, the line printer device 158, etc. is powered-on, when the user wishes to use it, and powered-off, when it is no longer necessary. However it is desirable that it is always in the on-state in the time zone such as the day time, during which the use frequency thereof is high, and that it is on/off-controlled as needed, when the use frequency thereof is low.

Now the control method, by which the terminals 165–167 are powered-off, will be explained. Here, in order to facilitate the explanation, it is supposed that a time sharing system (TSS) is used, while the user uses the terminal 165. The distributed supervision controller 120 automatically switches-off the power supply for the terminal, which is powered-on, although no user within the subcenter 163 controlled by itself works by using the TSS, and reports the status of the subcenter 163 to the centralized supervision device 100.

When there is no user in front of the terminal 165, the signal from the sensor 168 is '0', which is reported to the distributed supervision controller 120 through the signal line 151. The distributed supervision controller 120 examines the power-on/off status at that point of time. For this purpose, the control table within the distributed supervision controller 120 may be examined. When it is confirmed as the result of the examination of the control table that the power supply is switched-off, the terminal 165 is not powered by the power supply unit 130 and thus it is assured that the power supply for the terminal 165 is in the off-state.

On the contrary, when it is expressed as the result of the examination of the control table that the power supply is in the on-state, two cases, one where the user quits his seat for a while in course of execution of a job within the computer system and the other where he has forgotten to switch-off the power supply for the terminal, when he quit his seat after the execution of the job by using the relevant terminal. For the former case the power supply to the terminal must not be stopped, while for the latter case it should be stopped.

Therefore, in order to judge for which reason the terminal is still powered, the distributed supervision controller 120 sends a data stream of an operator command DISPLAY TSS, STATUS, device mnemonic name to the computer system through a signal line 1113. Then the operating system in the computer system returns status information of the terminal specified by the device mnemonic name in the operator command.

The distributed supervision controller 120 continues the power supply from the power supply unit, if the relevant terminal is in the use state, according to the status information returned by the operating system. On the contrary, if it is in the not used state, the distributed supervision controller 120 issues an instruction to stop to supply power to the terminal 165 to the power supply unit 130 through the signal line 152. In this way the power supply unit 130 stops the power supply to the terminal.

By the process described above, the automatic switch-off of the power supply for the terminal 165 is terminated. At this time, if the power supplies for all the groups of terminals are in the off-state, the whole computer system should be stopped and the power supply for the computer system is also switched-off. For this purpose the distributed supervision controller 120 reports to the centralized supervision controller 100 through the signal lines 153 and 154 the fact that the power supply for the relevant terminal is switched-off.

When the centralized supervision controller 100 receives a report from the distributed supervision controller 120 in each of the subcenters, it judges whether the computer system should be stopped or not.

The centralized supervision controller 120 should not stop the computer system, if there exist other jobs, which are being executed, or jobs waiting for execution within the computer system, even if the power supplies for all the groups of terminals are in the off-state. Therefore, in order to judge where there exist other jobs, which are being executed, or jobs waiting for execution, or not, the centralized supervision controller 120 generates automatically a data stream of an operator command

INQUIRY B, ALL and sends it to the computer system through the signal line 157.

The operating system within the computer system returns a response to the operator command described above to the centralized supervision controller 100 through the signal line 157. The centralized supervision controller 100 examines response information coming from the operating system within the computer system. As result, when there exist jobs in execution or jobs waiting for execution, the processing to stop the computer system is not effected, until all of these jobs have been executed.

When there remain no more jobs to be executed in the computer system, the centralized supervision controller 100 starts automatically the processing to stop the computer system.

When there exist neither jobs in execution nor jobs waiting for execution within the computer system, the centralized supervision controller 100 generates automatically operator commands one after another to stop the operating system and transmits them through the signal line 157. At this time the terminating processing of the operating system means to stop the on-line processing programs such as TSS, etc. after having taken a necessary measure not to execute any jobs to be executed under the operating system, to put the files, in which statistical information, accounting information, etc. are stored, in a state where they cannot be used and to put the computer system in a state where it can execute nothing other than the operating system thereunder.

When the terminating processing of the operating system is terminated, in order to put the power supplies for the central processing unit CPU 150, the SVP 151 and the groups of input/output devices 145, 153, 155–157 in the off-state, the centralized supervision controller 100 issues a power-off instruction to the power supply device unit PDU 152 through the signal line 156. The power supply device unit PDU 152 issues a power-off instruction to the power supply device 160 for the groups of input/output devices by means of the signal line 1110 and at the same time stops to supply power to the power supply line 1115. In this way the power supplies for the central processing unit and the groups of input/output devices are put in the off-state.

Next, in order to stop the air conditioning equipment 161, the centralized supervision controller 100 issues a power-off instruction to the power supply device 171 through the signal line 155.

As described above, the saved power operation of the computer system by the operation control without operator can be achieved by the monitoring and controlling apparatus for computer system according to this invention.

Further the centralized supervision controller 100 may effect the control, combining the time zone schedule control in addition to the control method described above with the operation schedule for the computer system. For example it is possible that either the computer system is not driven in the user dependent manner, but driven always until the midnight time zone, and it is driven in the midnight time zone in the user dependent manner, or that a weekly or monthly schedule is planned and it is driven in the user dependent manner only on the holiday.

Figure 2:
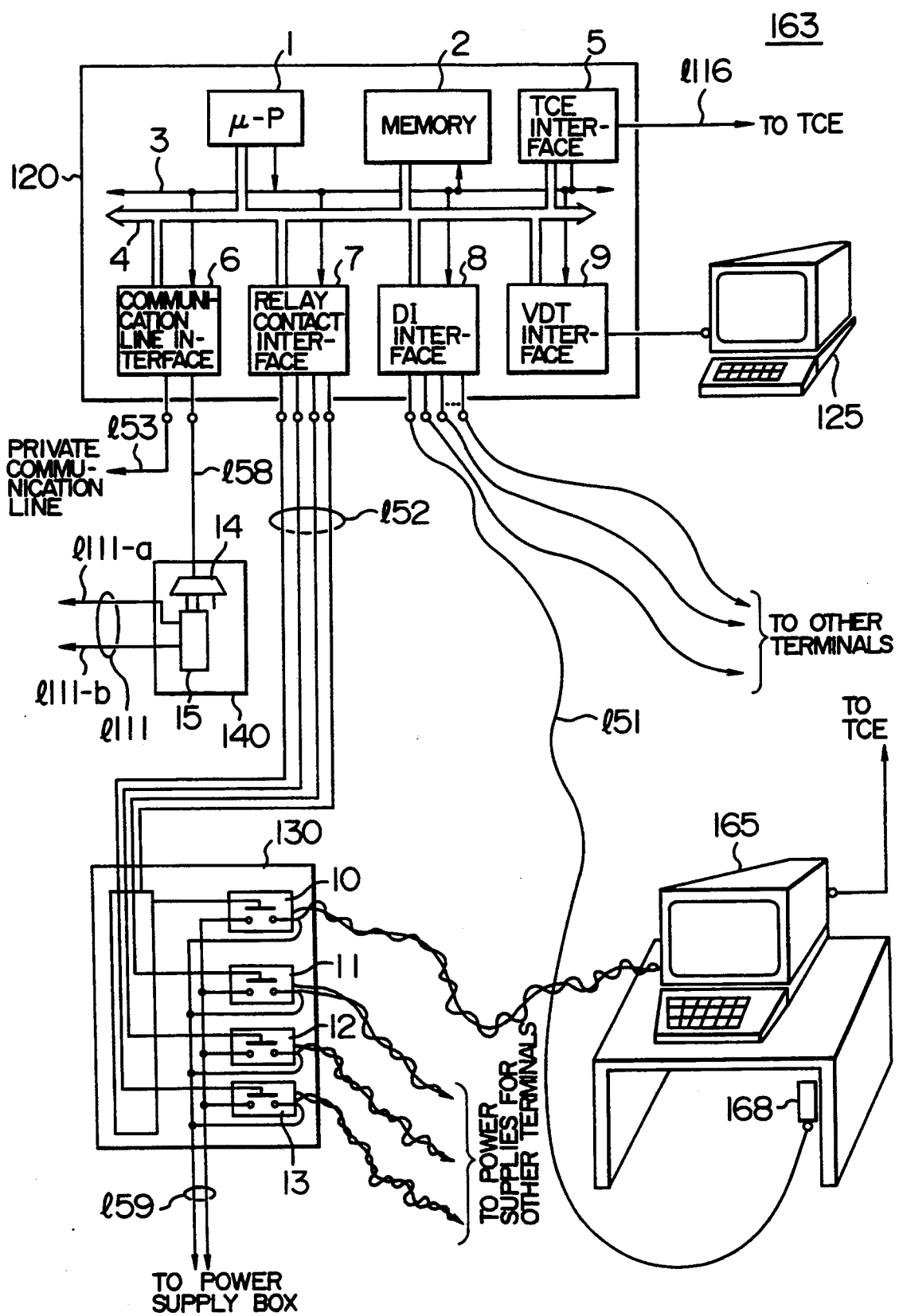
FIG. 2 is a scheme illustrating the construction of a distributed supervision controller, a power supply unit and a remote power controller.

Now the structure and the operation of the groups of devices constituting the operation monitoring and controlling apparatus for computer system according to this invention, referring to FIG. 2 and the followings.

FIG. 2 is a scheme illustrating control devices according to this invention disposed in the subcenter 163 in FIG. 1 and the connecting relation among these control devices. In FIG. 2 the same devices as those indicated in FIG. 1 are represented by the same reference numerals as those in FIG. 1.

In the figure the distributed supervision controller 120 is a control device incorporating a micro processor. Reference numeral 1 is a micro processor μ-P; reference numeral 2 is a memory area storing processing programs and control tables within the distributed supervision controller; reference numeral 3 is an address bus; reference numeral 4 is a data bus; reference numeral 5 is a TCE interface circuit; reference numeral 6 is a communication line interface circuit; reference numeral 7 is a relay contact outputting interface circuit; reference numeral 8 is a digital input (DI) interface circuit; reference numeral 9 is a video data terminal (VDT) interface circuit; and reference numeral 125 is a display device and a keyboard device.

The power supply unit 130 is constituted by relay circuits 10–13, which on/off-controls power supply lines from a power supply box to control the power supply to a terminal 165 on the basis of on/off signals in the relay contact output signal line 152 within the distributed supervision controller 120.

The remote power controller 140 is constituted by a decoder circuit 14 and a signal generating circuit 15, which sends control signals to power supplies for the groups of peripheral devices 157 and 158 indicated in FIG. 1 on the basis of on/off-instruction information coming from a communication line interface circuit 6 within the distributed supervision controller 120. Reference numeral 1111-a indicates a power-on instruction signal and reference numeral 1111-b a power-off instruction signal. The communication line interface circuit 6 is connected with the private branch exchanger 162 through the signal line 153.

The output signal of a sensor 168 disposed on the terminal console is inputted in the DI interface circuit 8 within the distributed supervision controller 120 through the signal line 151.

When a user of the terminal sits in front of the terminal 165, the sensor 168 detects it and a level signal, whose value is '1', is reported to the DI interface circuit 8 through the signal line 151. On the other hand, in the case where the user uses the groups of peripheral devices such as the magnetic tape device 157, the line printer devices 158, etc., he declares the use of the relevant peripheral devices by means of the display device 125 and the keyboard device in the distributed supervision controller 120.

Figure 3:
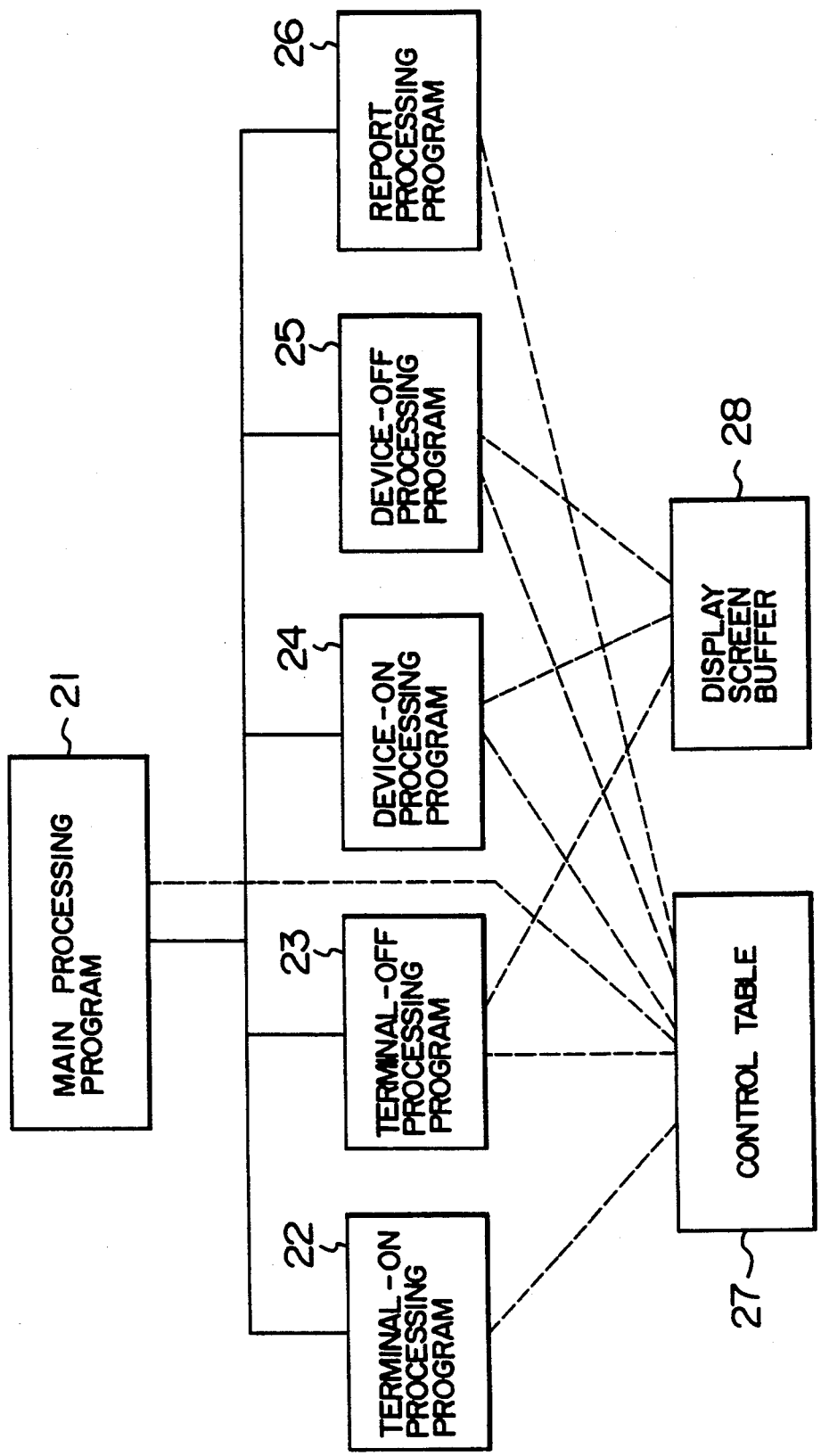
FIG. 3 is a scheme indicating the structure of a processing program working within the distributed supervision controller.
Figure 4:
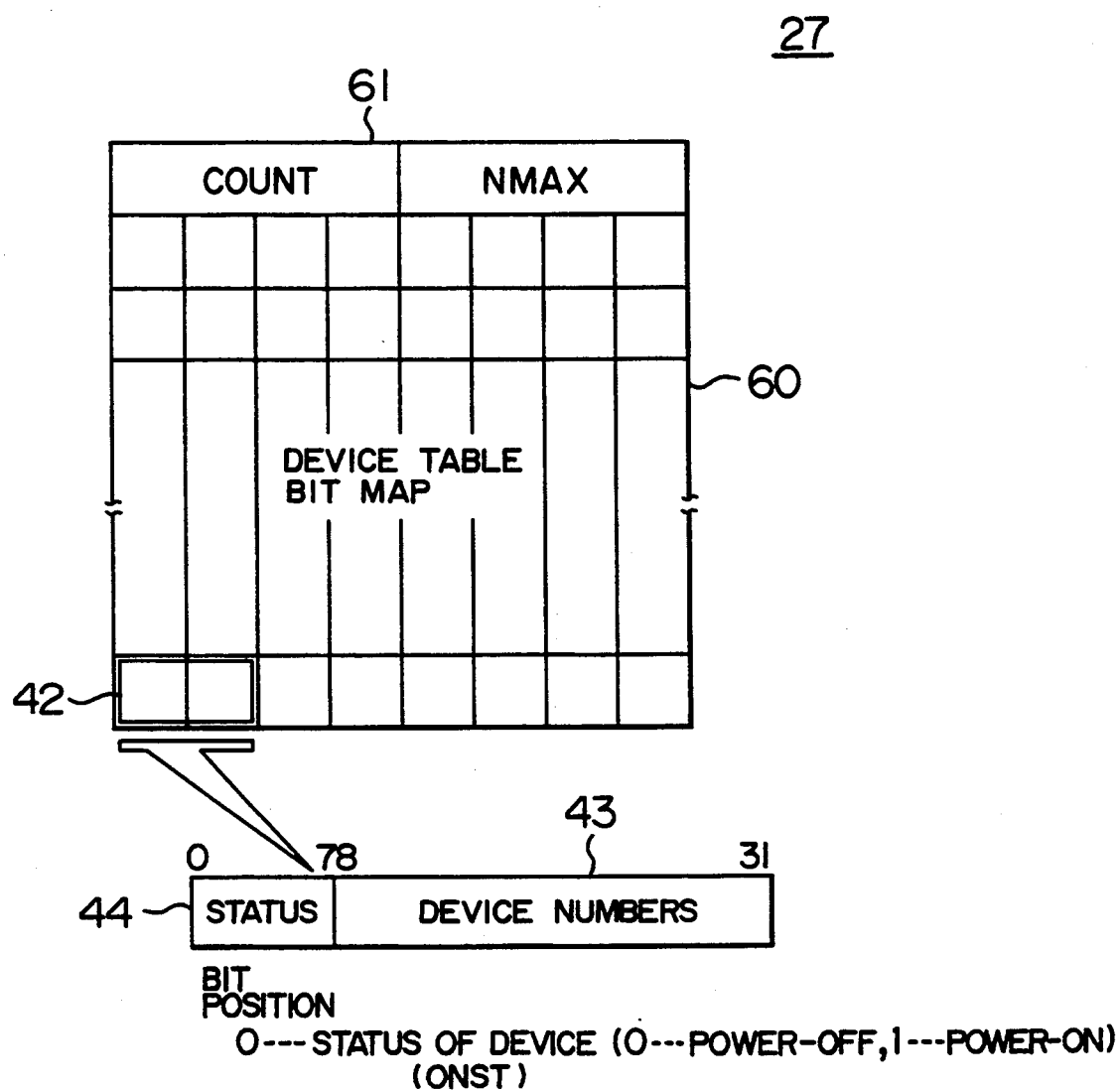
FIG. 4 is a scheme indicating the structure of a device control table for every subcenter.
Figure 5:
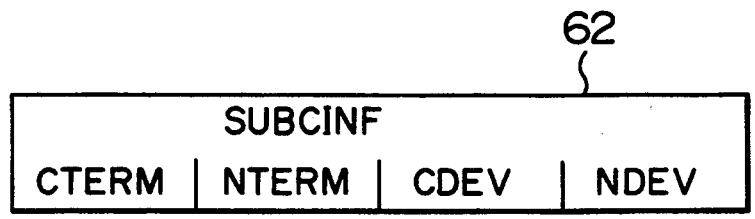
FIG. 5 is a scheme indicating the formality of data, in which the status of the groups of devices within each of the subcenters is reported from the distributed supervision controller to the centralized supervision controller.
Figure 6:
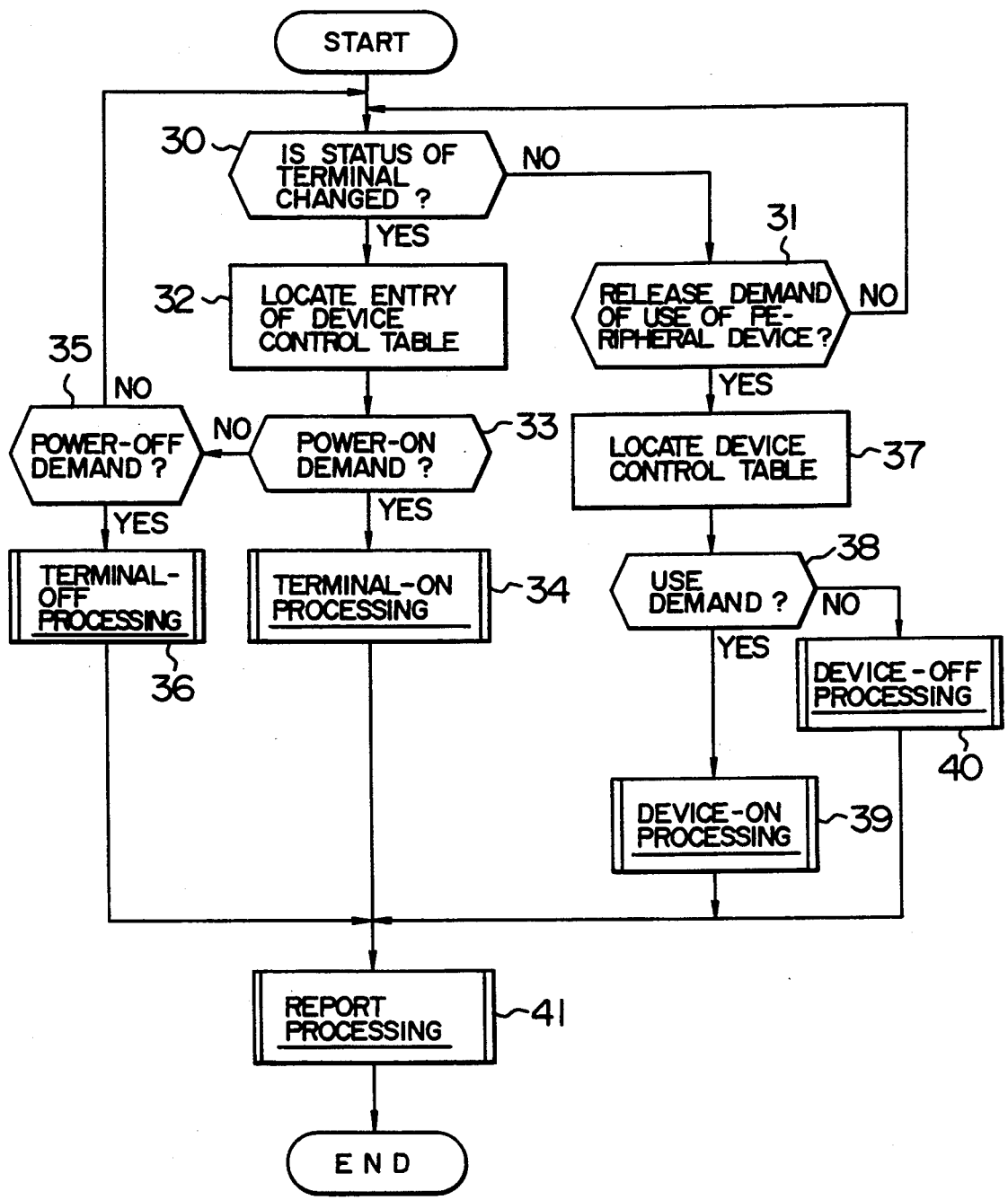
FIG. 6 is an operation flow chart of a main processing program indicated in FIG. 3.
Figure 7:
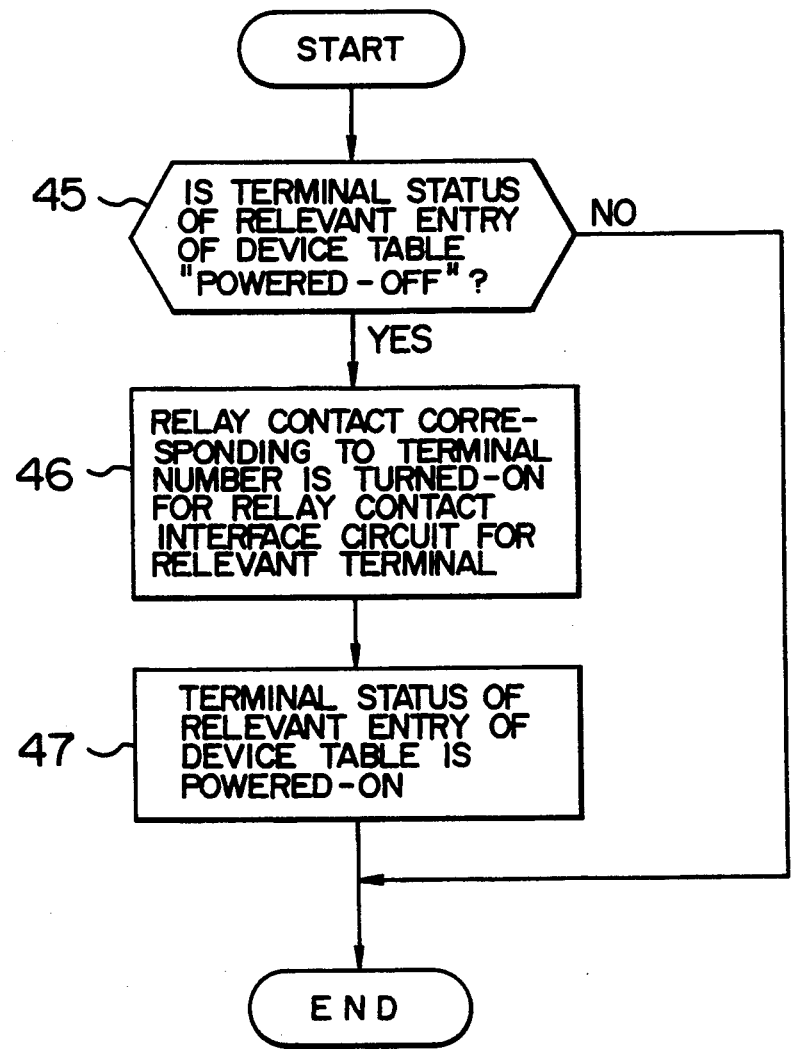
FIG. 7 is an operation flow chart of a terminal-on processing program.
Figure 8:
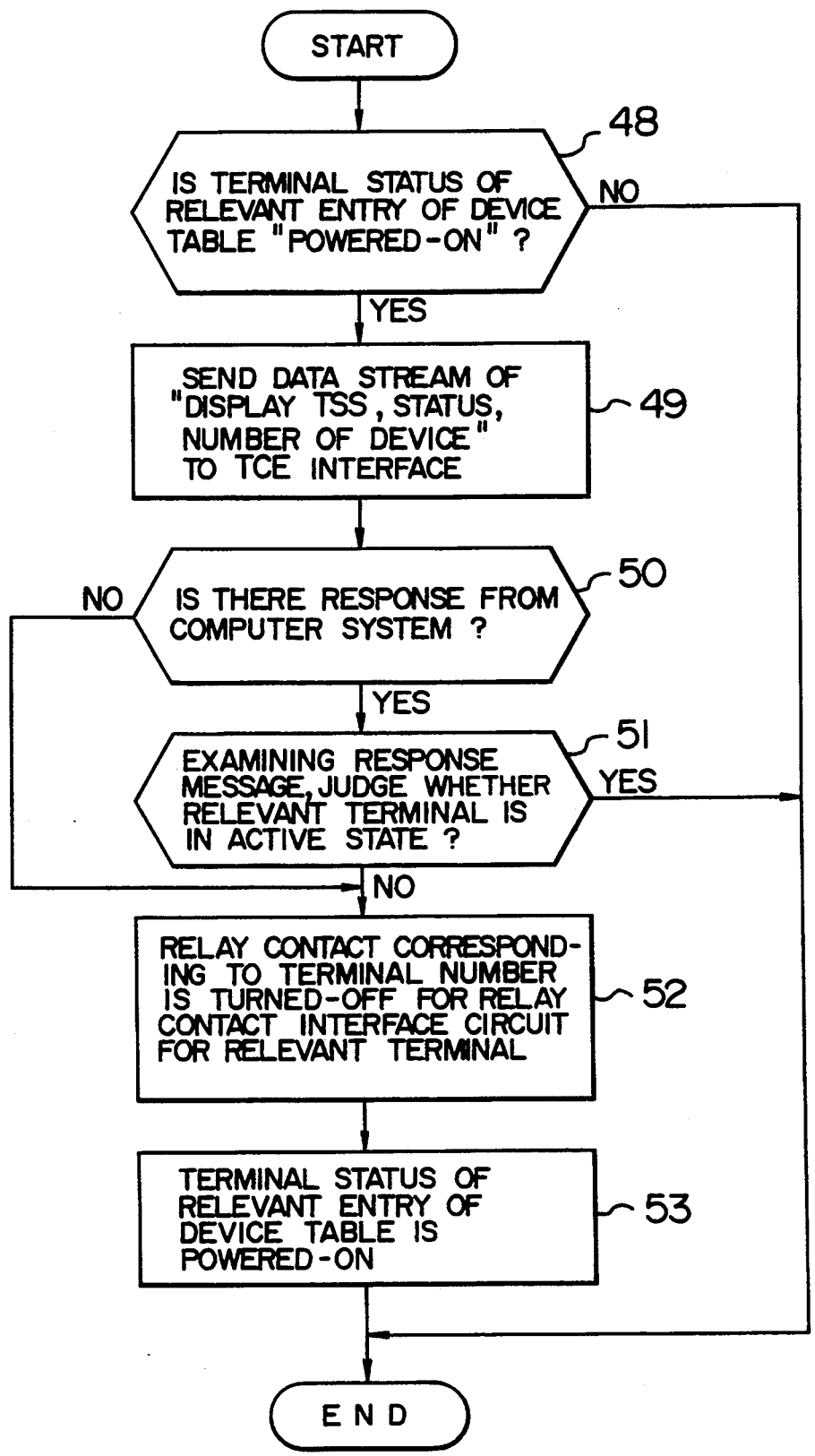
FIG. 8 is an operation flow chart of a terminal-off processing program.
Figure 10:
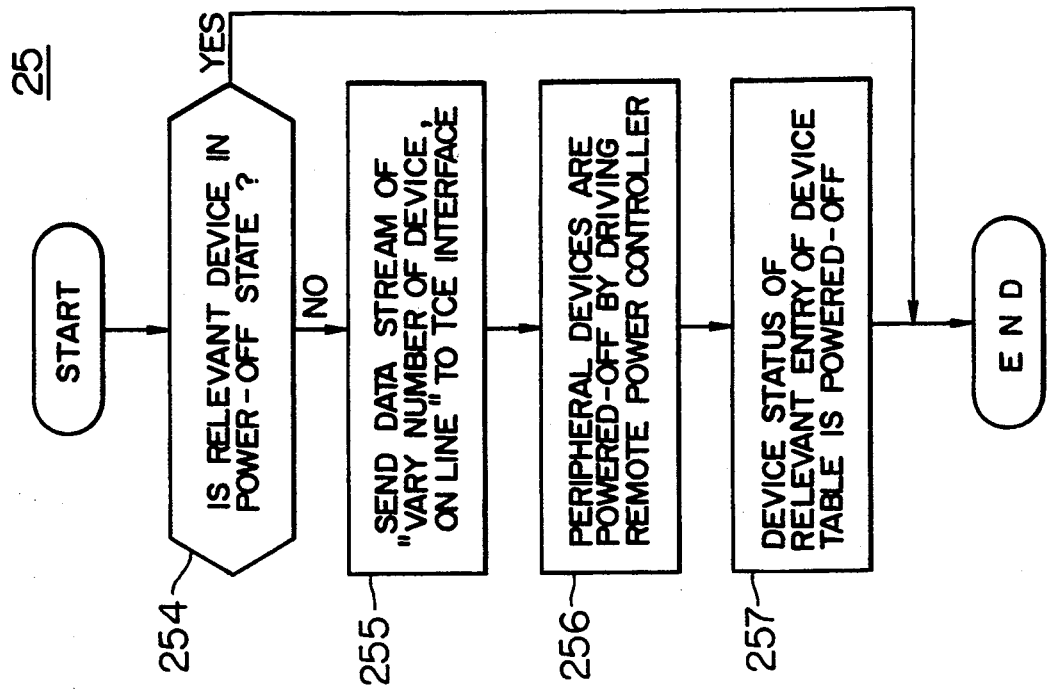
FIG. 10 is an operation flow chart of a peripheral-device-off processing program.
Figure 9:
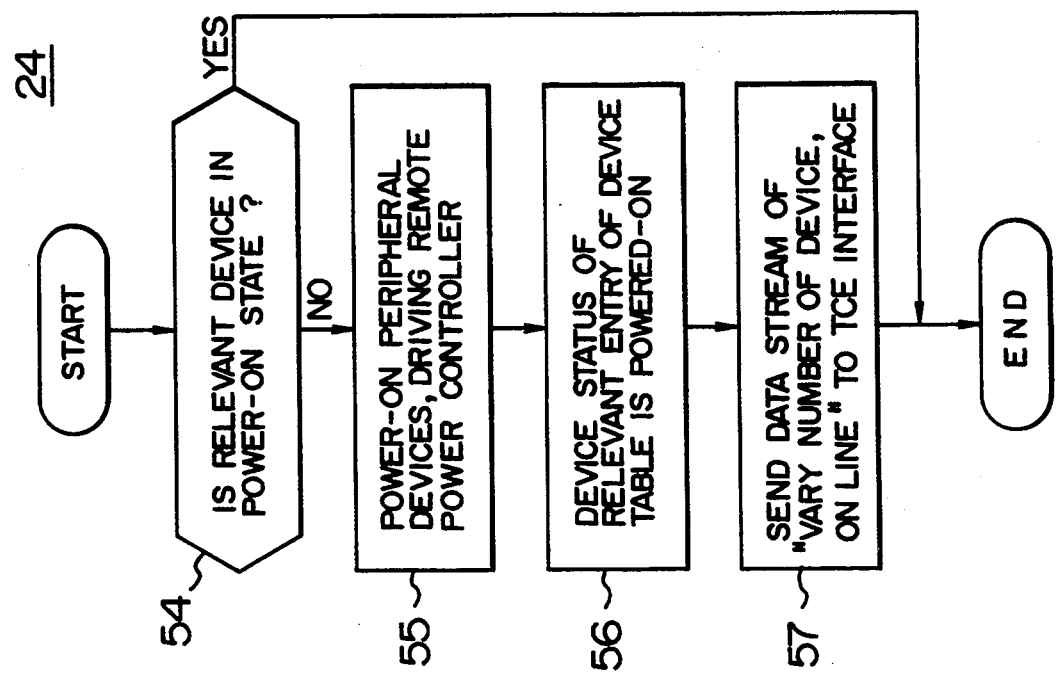
FIG. 9 is an operation flow chart of a peripheral-device-on processing program.
Figure 11:
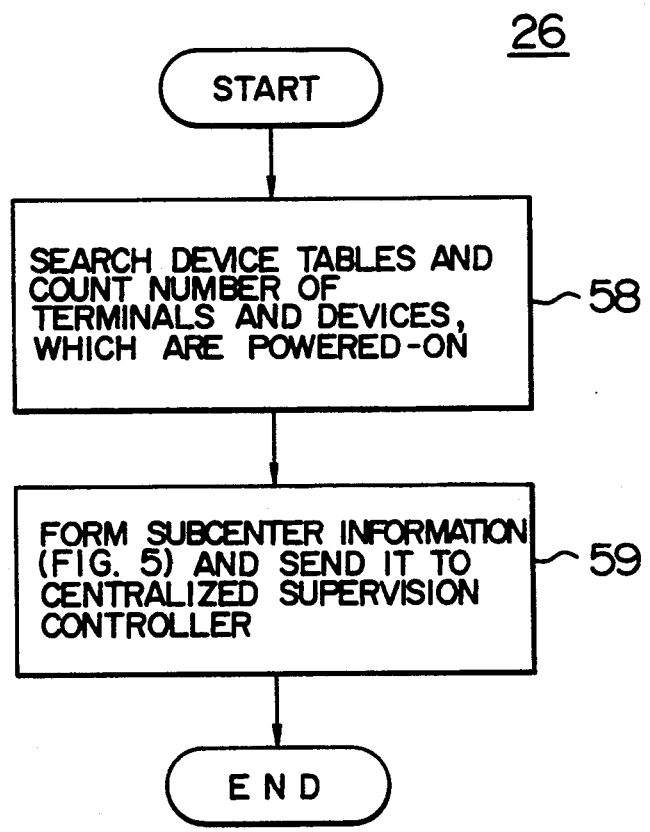
FIG. 11 is an operation flow chart of a report processing program.

As described above, when the user declares the use of a certain group of terminals or peripheral devices, the processing program within the memory 2 is put in running. FIG. 3 shows relations between groups of processing programs and control tables. FIG. 4 shows the structure of the device control table for every subcenter and the entry of each of devices (terminals or peripheral devices) is provided with the power-on/off status and the number of device. In FIG. 4, COUNT shows the number of connected devices and NMAX shows the maximum number of table entries. FIG. 5 represents the data formality, when the status of the groups of devices in each of the subcenters 163 is reported from the distributed supervision controller 120 to the centralized supervision controller 100. FIGS. 6–11 show flow charts indicating the operation of processing programs working within the distributed supervision controller. FIG. 6 is an operation flow chart of the main processing program 21 indicated in FIG. 3; FIG. 7 is an operation flow chart of the terminal-on processing program 22;

FIG. 8 is an operation flow chart of the terminal-off processing program 23; FIG. 9 is an operation flow chart of the peripheral-device-on processing program 24; FIG. 10 is an operation flow chart of the peripheral-device-off processing program 25; and FIG. 11 is an operation flow chart of the report processing program. In the above, "off" means to switch-off the power supply and "on" means to switch-on the power supply.

Now the operation of the group of the processing programs within the distributed supervision controller 120 will be explained, referring to FIGS. 3–11. Referring to FIGS. 3 and 6, the main processing program 21 judges whether the status changes are those of the terminals or those of the peripheral devices by using judgment processings 30 and 31 indicated in FIG. 6. If they are status changes of the terminals, processings 32–41 are executed, and if they are status changes of the peripheral devices, processings 37–41 are executed.

The status change of the terminals by the judgment processing can be known by the input signal from the DI interface circuit 8 indicated in FIG. 2. In the case of the status change of the terminals, each of the entries 42 of the device control table 27 indicated in FIG. 4 is searched and the entry 42 corresponding to the number 43 of the relevant terminal is located. If it is known by the judgment processing 32 that the value of the signal line 151 indicated in FIG. 2 is '1', i.e. it is a power-on demand, the terminal-on processing indicated in FIG. 7 is executed. On the contrary, if it is a power-off demand, the terminal-off processing indicated in FIG. 8 is executed. The judgment processing 45 indicated in FIG. 7 examines the status information indicated in FIG. 4. After that, by the processing 46 the relevant relay circuit 10 in the power supply unit 130 indicated in FIG. 2 is driven so that it is started to supply power to the terminal 165.

FIG. 8 shows the power-off processing of a terminal. If the status information 44 of the entry 42 of the relevant terminal is "powered-off" in the judgment processing 48, nothing is done. If the status information 44 indicates the power-on status, a confirmation command is sent by a processing 49 to the computer system. This drives the TCE interface circuit 5 indicated in FIG. 2 and is sent to the TCE 145. A response message is sent from the computer system to a display screen buffer 28 indicated in FIG. 3 through a signal line 1116. If it is recognized that there is no response by the judgment processing 50, the computer system is not driven and the succeeding judgment processing 51 is passed over. The judgment processing examines the case where the user quits his seat for a while in course of execution of a job within the computer system. Consequently, in this case, the power-off processing is not executed.

As the result of a judgment processing 51, if the relevant terminal is in the not used state, the relay circuit 10 within the power supply unit 130 is driven by a processing 52 so that the power supply to the relevant terminal is stopped. Then the status information 44 is put in the power-off state by a processing 53.

Referring again to FIG. 6, when the user declares the use of the group of peripheral devices by means of the display device 125 and the keyboard indicated in FIG. 2 or the termination of the use, an on-processing 39 or an off-processing 40 for the device is executed through the judgment processing 31 and the processing 37.

FIG. 9 is an operation flow chart of the power-on processing for the device and FIG. 10 is an operation flow chart of the power-off processing therefor. A judgment processing 54 examines the status information 44 of the relevant device. A processing 55 drives the remote power controller 140 and sends a signal '1' to the signal line 1111-a. In this way the peripheral devices are put in the power-on state and the succeeding processing 57 connects logically the relevant device with the operating system.

For the power-off processing for the device a processing, which is inverse to the operation indicated in FIG. 9, may be executed, as indicated by the operation flow chart including elements 254, 255, 256 and 257 in FIG. 10. Further the power-off processing for the device may be also so constructed that the status of the device is supervised for every constant period.

When the power-on/off processing for the group of terminals and devices described above is terminated, the distributed supervision controller 120 informs the centralized supervision controller 100 of the status of the groups of devices within the subcenter 163. FIG. 11 is an operation flow chart of the report processing 41 indicated in FIG. 6. At first a processing 58 examines each of the entries in the device map 60 and counts the number of terminals and devices, which are powered-on. The number of search loops is equal to the number of connected devices COUNT 61. Next a processing 59 forms subcenter information SUBCINF 62 indicated in FIG. 5. This information is sent to the centralized supervision controller 100 through the signal lines 153 and 154.

The centralized supervision controller 100 judges whether the computer system should be started or stopped on the basis of subcenter information transmitted by the distributed supervision controller 120 in each of subcenters 163, 164 and performs processings based thereon.

Figure 12:
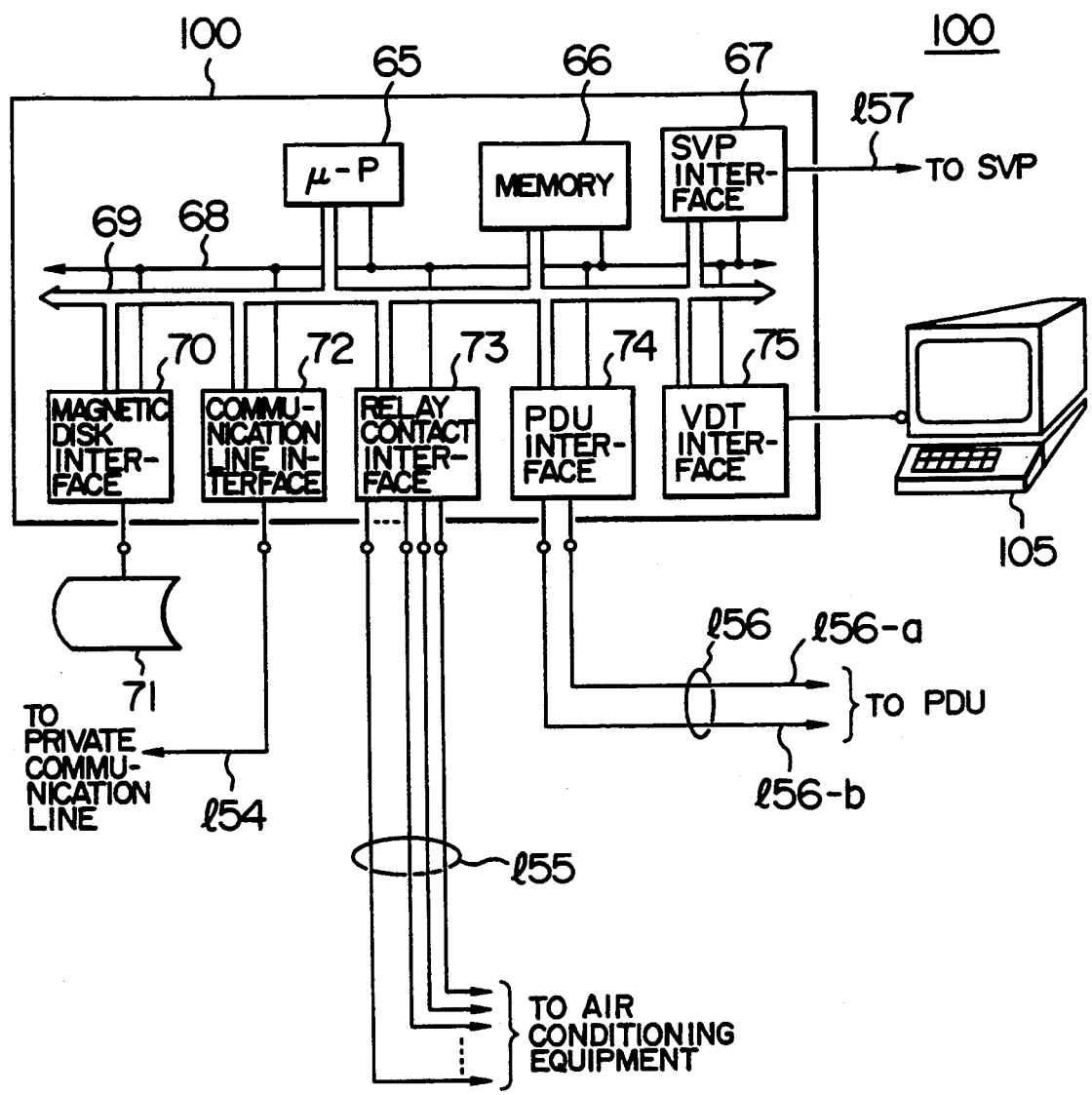
FIG. 12 is a scheme illustrating the construction of the centralized supervision controller.

FIG. 12 is a scheme illustrating the structure of the centralized supervision controller 100 indicated in FIG. 1. The groups of signal lines identical to those in FIG. 1 are represented by the same reference numerals as those in FIG. 1.

Figure 13:
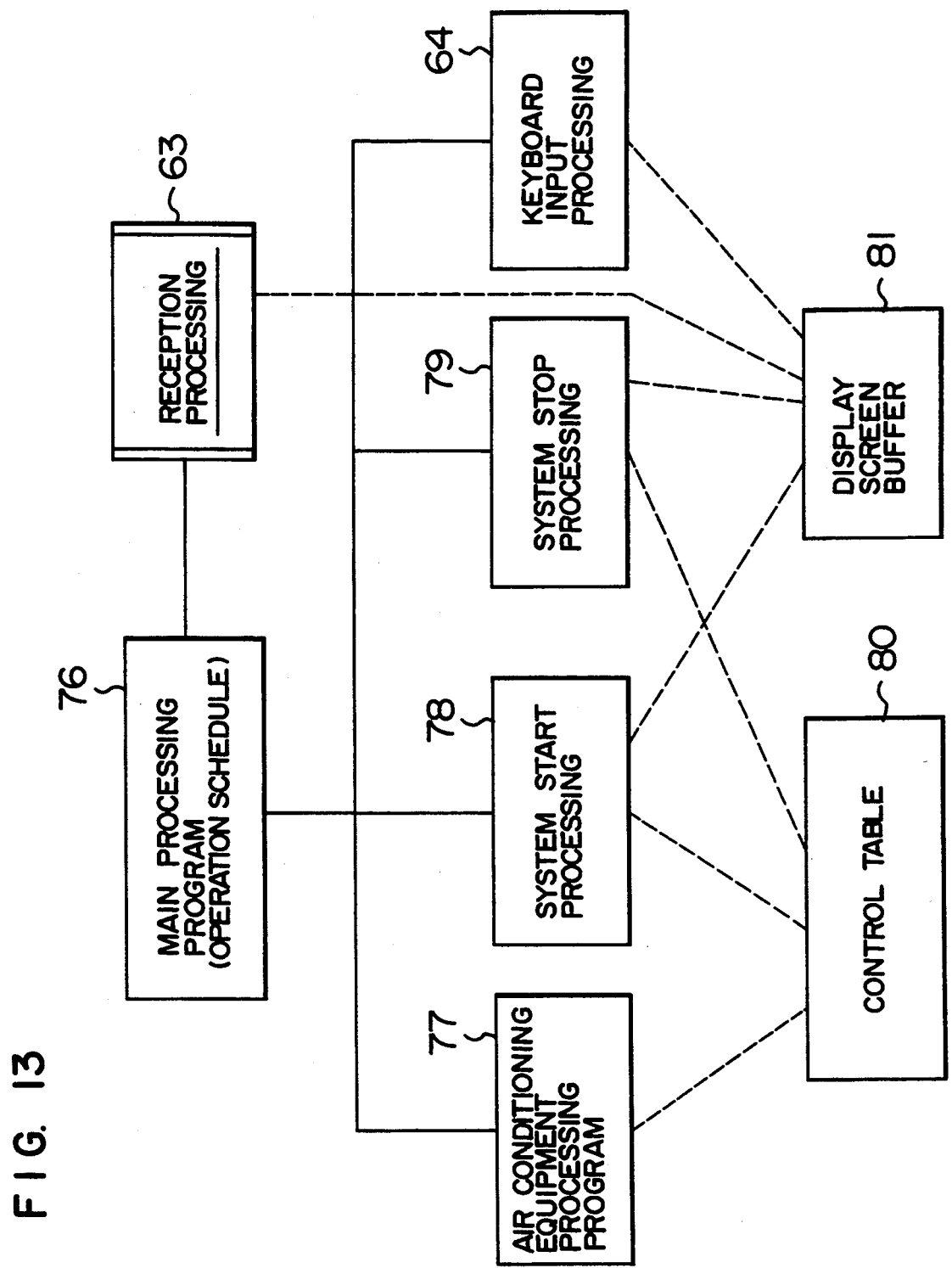
FIG. 13 is a block diagram illustrating the structure of a processing program working within the centralized supervision controller.
Figure 15:
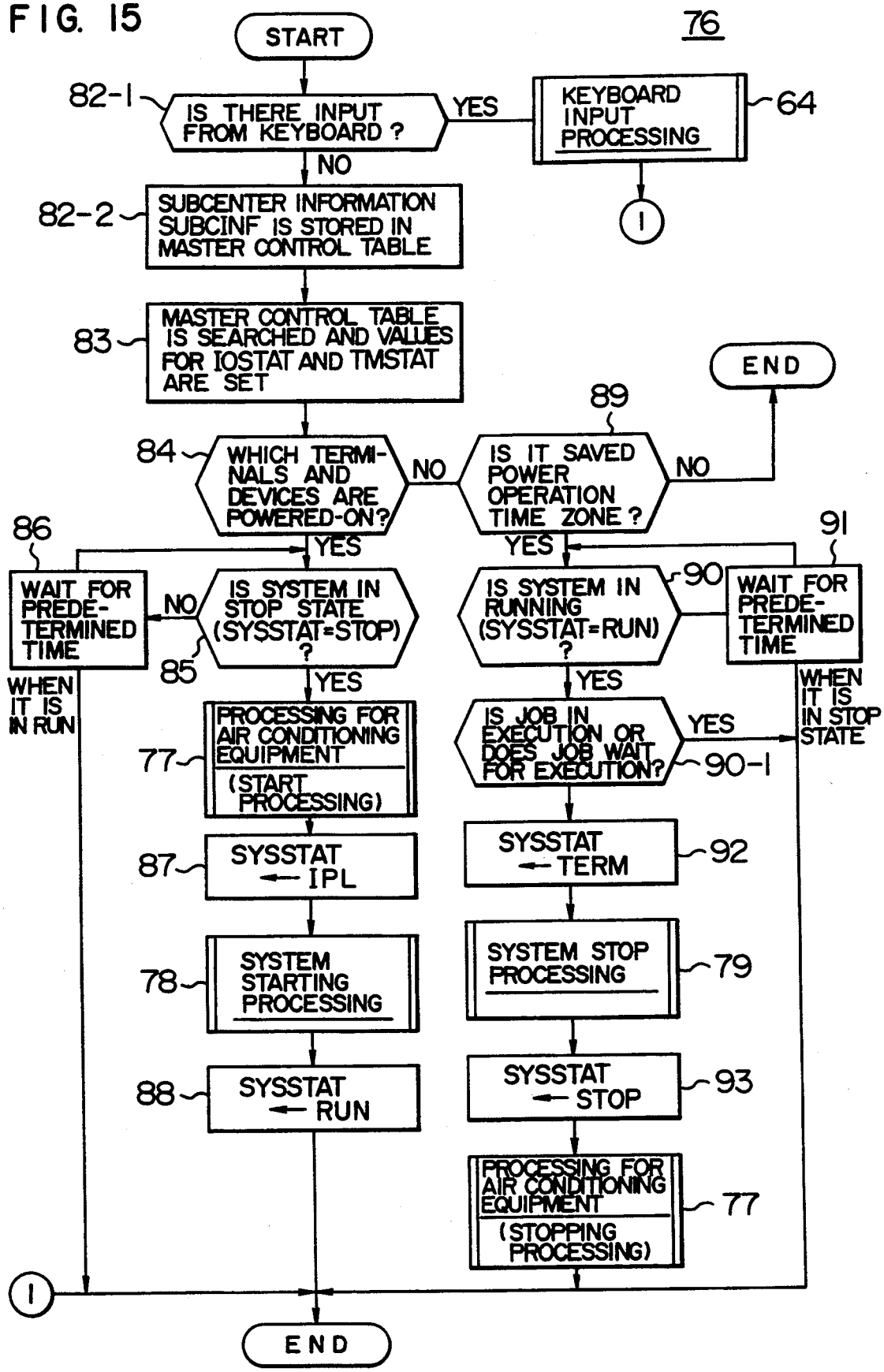
FIG. 15 is a flow chart showing operations of groups of processing programs.
Figure 17:
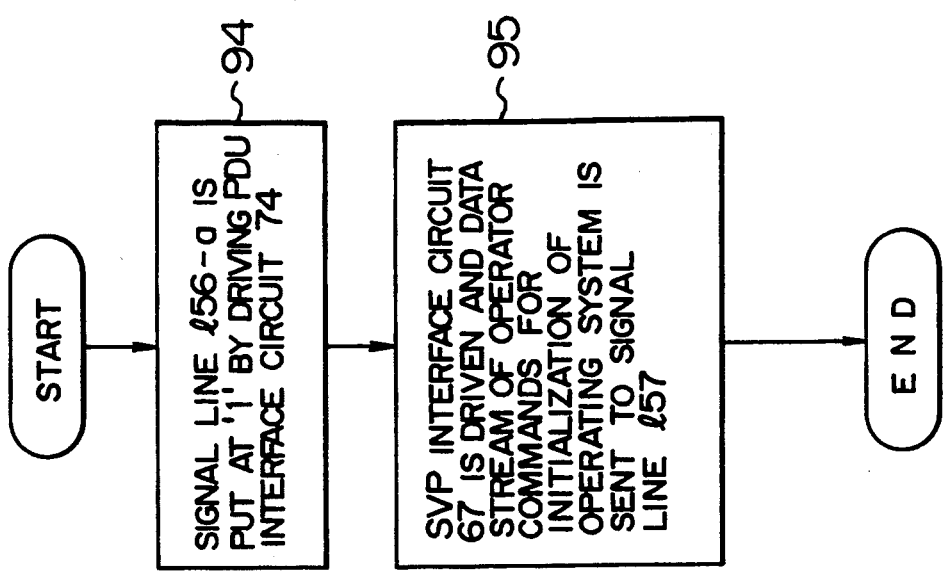
FIG. 17 is yet another flow chart showing operations of groups of processing programs.
Figure 16:
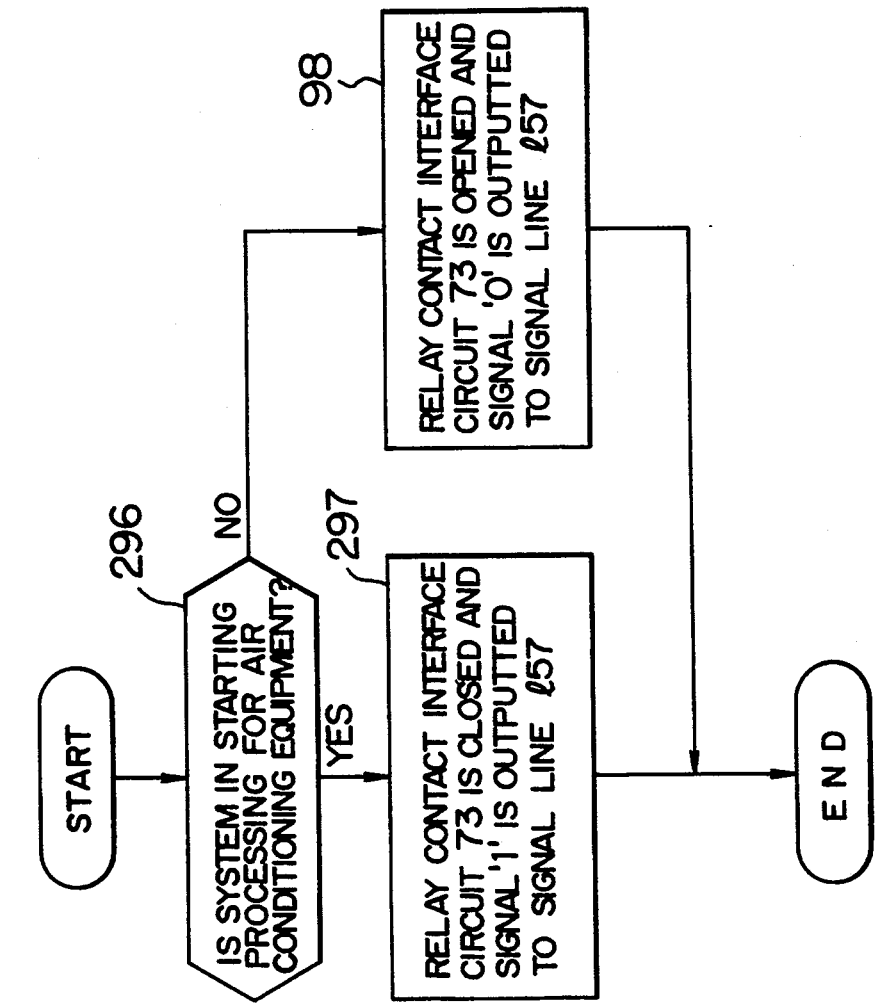
FIG. 16 is another flow chart showing operations of groups of processing programs.
Figure 19:
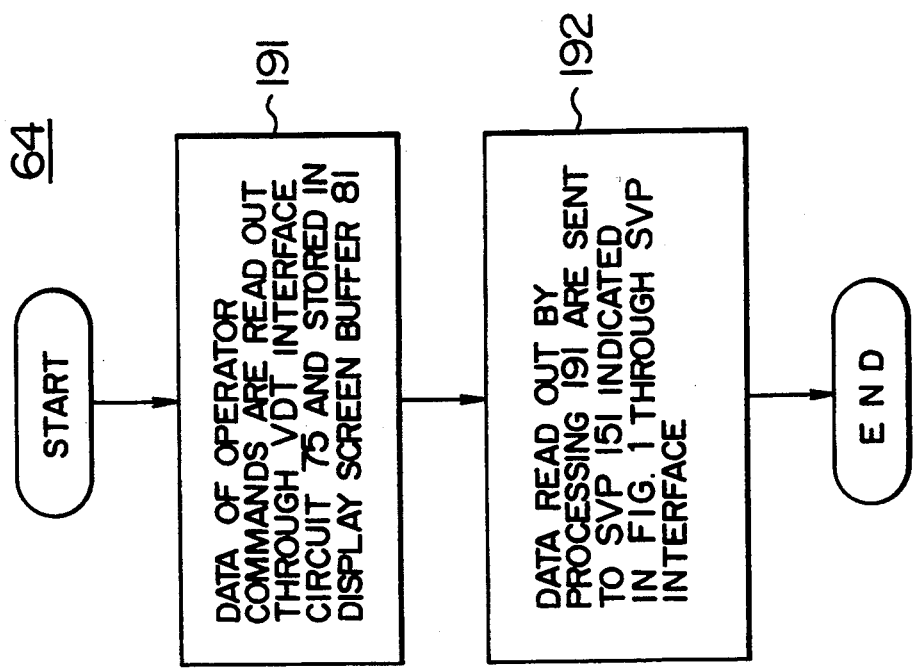
FIG. 19 is a different flow chart showing operations of groups of processing programs.
Figure 18:
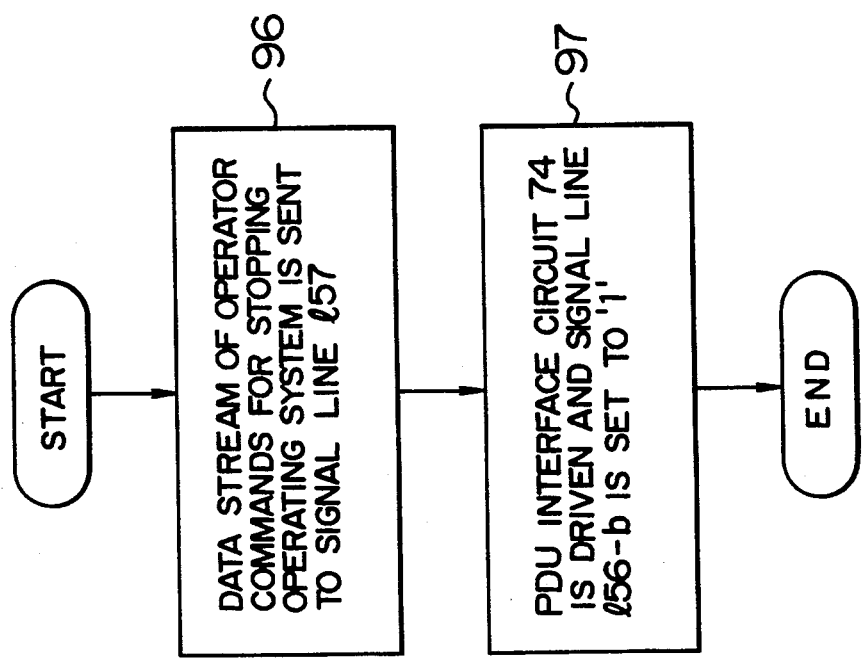
FIG. 18 is still further another flow chart showing operations of groups of processing programs.

As it can be seen clearly from FIG. 12, the centralized supervision controller 100 is a control device incorporating a micro processor. Reference numeral 65 is a micro processor; reference numeral 66 is a memory area storing processing programs and control tables within the centralized supervision controller; reference numeral 67 is a service processor interface circuit; reference numeral 68 is an address bus; reference numeral 69 is a data bus; reference numeral 70 is a magnetic disk device interface circuit exclusively used by the centralized supervision controller 100; reference numeral 71 is a magnetic disk device; reference numeral 72 is a communication line interface circuit; reference numeral 73 is a relay contact interface circuit; reference numeral 74 is a power supply device unit PDU interface circuit of the computer system; and reference numeral 75 is an interface circuit (video data terminal VDT interface circuit) of the keyboard/display device 105. FIGS. 13-19 show groups of processing programs and control tables stored in the memory 66. FIG. 13 shows the structure of the processing programs and the control blocks, in which the broken lines indicate to access the control table 80 and the display screen buffer 81. FIG. 15 is a flow chart representing the operation of the main processing program; FIG. 16 is a flow chart representing the operation of the start/stop processing for the air conditioning equipment and including elements 296, 297 and 98; FIG. 17 is a flow chart representing the operation of the system start processing; FIG. 18 is a flow chart representing the operation of the system stop processing; and FIG. 19 is a processing flow chart, when the operator inputs command data from the keyboard/display device 105.

The operation of the groups of processing programs within the centralized supervision controller 100 will be explained, referring to FIGS. 12-19, wherein FIGS. 15-19 are flow charts showing operations of groups of processing programs working within the centralized supervision controller. The main processing program 76 is operated when the centralized supervision controller 100 receives the subcenter information SUBCINF 62 indicated in FIG. 5 sent from the distributed supervision controller 120 in each of the subcenters through the signal line 154. It is when the subcenter information is received, when the operator inputs an operator command through the keyboard/display device 105 and when response data are sent from the SVP 151 that this main processing program 76 is operated.

Referring to FIG. 15, the main program 76 stores the SUBCINF 62 in an SUBINF area 181 for the relevant subcenter within the master control table 180 indicated in FIG. 14 by a processing 82-2 after having confirmed the reception of the subcenter information 62 by a processing 82-1. The processing program 64 is a processing, by which, when command data are inputted from the keyboard, the data are sent through the service processor interface circuit 67, and the operation thereof will be explained later, referring to FIG. 19. The processing 63 is a processing when response data are sent from the SVP 151. Then, by a processing 83, the subcenter information from SUBCINF 181 to SUBCINF 184 within the master control table 180 is searched and the status of the groups of devices and terminals is stored in IOSTAT 186 and TMSTAT 187, respectively.

The succeeding judgment processing is a processing for judging whether IOSTAT=RUN or TMSTAT=-RUN. As the result of the judgment, if even only one of the groups of devices and terminals is in the power-on state, the processings 85–88 are executed and this is a processing, by which it is tried to start the computer system. At first, by the judgment processing 85, if the system is in the stop state, as indicated in the meaning of SYSSTAT 185, the system is in either one of the states of system in starting (IPL), system in running (RUN) and system in termination processing (TERM). Now, by the processing 86, if SYSSTAT=RUN, this processing is terminated, and otherwise after having waited for a certain period of time, the processing 85 is again executed.

If the system is in the stop state (SYSSTAT=STOP), a starting processing 77 for the air conditioning equipment is started. The flow of the operation of this processing is as indicated in FIG. 16. Next the system status (SYSSTAT) is put in "IPL" and a system start processing 78 is started. After the termination of the system start, the system status (SYSSTAT) is put in "RUN" by a processing 88 and the system start is terminated. FIG. 17 is an operation flow chart for the system start. The power supply for the computer system is switched-on by driving the PDU interface circuit 74 by a processing 94. By a processing 95, as stated previously, a data stream of operator commands is generated automatically and they are sent one after another to the computer system through the SVP interface circuit 67 indicated in FIG. 12.

Referring again to FIG. 15, if it is confirmed as the result of the judgment processing 84 that the power supplies for all the groups of devices and terminals are in the power-off state, processings 89–93 and the followings are executed and it is tried to execute the processing to stop the system.

At first, by the judgment processing 89, the daily schedule 182 and the weekly schedule 183 indicated in FIG. 14 are examined and it is examined also whether the present point of time is in the saved power operation time zone or not. If it is recognized as the result of the judgment processing that it is not in the saved power operation time zone, the processing to stop the system is not executed.

Next it is examined by the processing 90 whether the system is in running (SYSSTAT=RUN) or not. When the system is not in running, by the processing 91, when the system is in the stop state (SYSSTAT=STOP), the processing is terminated and otherwise the judgment processing 90 is again executed.

When the system is in running, by the judgment processing 90-1, as stated previously, it is examined whether jobs are in course of execution or there are jobs waiting for execution within the computer system or not. This is done by sending a data stream of
INQUIRY B, ALL
which is an operator command from the SVP interface circuit 67 to the computer system through the signal line 157. Since the response message from the computer system is returned to the display screen buffer indicated in FIG. 13, it is sufficient to examine this message.

If there are no jobs in course of execution or waiting for execution, by the processing 92, the system stop processing 79 is started after having put the system status (SYSSTAT) at "TERM". FIG. 18 is an operation flow chart of the system stop processing 79. By a processing 96 a data stream of operator commands for stopping the operating system is sent successively from the SVP interface circuit 67 and stops the operating system for the computer system. Next, by a processing 97, the PDU interface circuit 74 is driven and the signal on a signal line 156-b is set to '1'. In this way the PDU 152 indicated in FIG. 1 is driven and the power supply to the computer system is stopped.

Referring again to FIG. 15, the main processing program 76 in the centralized supervision controller stops the air conditioning equipment by the processing 77 after having set the system status to "STOP".

The stop of the air conditioning equipment is done by executing a processing 98 indicated in FIG. 16.

Now the operation when the operator has inputted an operator command by means of the keyboard/display device 105 will be explained. Referring to FIGS. 12, 13, 15 and 19, command data inputted through the keyboard/display device 105 are stored in the display screen buffer 81 within the memory 66 through the VDT interface circuit 75. This processing is executed by a processing 191 indicated in FIG. 19. Next, by a processing 192, these command data are sent to the SVP 151 through the SVP interface circuit 67 indicated in FIG. 12.

Consequently the centralized supervision controller 100 according to this invention includes the conventional master console function and thus it is possible to generate automatically the operator commands. In this way, the computer system can be provided with the function to transmit the operator commands to the service processor and at the same time it can transmit also command data inputted by the operator to the service processor. Further, a reception processing 63 indicated in FIG. 13 is a processing, by which, when output message data from the computer system are received through the signal line 157 indicated in FIG. 12, these message data are displayed on the keyboard/display device 105 after having been stored in the display screen buffer 81.

As explained above, according to this invention, since the behavior of the computer system is always supervised and it is possible to switch-off automatically the power supplies for the terminals or peripheral devices, which are not used, to stop automatically the computer system and the air conditioning equipment or inversely to start automatically as needed the power supplies of the processors as well as the groups of terminals and peripheral devices, an effect to realize a saved power operation or saved labor operation of the computer system can be obtained.

Further another effect is obtained by using the centralized supervision controller according to this invention such that the prior art master console device for the operator becomes unnecessary.

What is claimed is:

1. In a computer system including a central processing unit, input/output devices, terminals, and a service processor connected to said central processing unit, an operation monitoring and controlling apparatus comprising:

monitoring means for monitoring a status of use by a user of each of said input/output devices and said terminals; and control means responsive to a result of monitoring provided from said monitoring means for selectively performing one of first and second operations for automatic control of said central processing unit, the first operation including the steps of (1) automatically generating a first command for starting an operating system running in the computer system and (2) supplying the first command to said service processor, and the second operation including the steps of (3) generating automatically a second command for stopping said operation system, and (4) sending the second command to said service processor, wherein the first command is the same as a predetermined command which said service processor needs to receive in order to start the operating system, when power supply to said central processing unit is to be switched on, and the second command is the same as a predetermined command which said service processor needs to receive in order to stop the operating system, when the power supply is switched off;

wherein said monitoring means includes means responsive to a result of monitoring of a status of each of said input/output devices and said terminals for automatically stopping power supply to one relevant device among said input/output devices and terminals when said one device is not in use and for automatically supplying power to said one device, when use of said one device is demanded.

2. An operation monitoring and controlling apparatus according to claim 1, wherein said monitoring means further includes means for generating automatically a third command to examine whether a certain device which is in a power-on state is actually in use by a user or not for sending the third command to said central processing unit, for examining message data, which are a response to the third command from said central processing unit, and for detecting whether said device is in use or not.

3. An operation monitoring and controlling apparatus according to claim 2, wherein said monitoring means further includes means for detecting a user's terminal use demand by means of one of a switch in a keyboard/display device disposed in each of said terminals, a demand switch disposed in proximity to each terminal, and a user detecting sensor disposed in proximity to each terminal.

4. In a computer system including a central processing unit, input/output devices, terminals, and a service processor connected to said central processing unit, an operation monitoring and controlling apparatus comprising:

monitoring means for monitoring a status of use by a user of each of said input/output devices and said terminals; and control means responsive to a result of monitoring provided from said monitoring means for selectively performing one of first and second operations for automatic control of said central processing unit, the first operation including the steps of (1) automatically generating a first command for starting an operating system running in the computer system and (2) supplying the first command to said service processor, and the second operation including the steps of (3) generating automatically a second command for stopping said operation system, and (4) sending the second command to said service processor, wherein the first command is the same as a predetermined command which said service processor needs to receive in order to start the operating system, when power supply to said central processing unit is to be switched on, and the second command is the same as a predetermined command which said service processor needs to receive in order to stop the operating system, when the power supply is switched off;

wherein said monitoring means further comprises means for automatically generating a data stream of operator commands for automatically examining although a certain device is in a power-on state, whether or not a user uses said certain device, for sending the data stream to said central processing unit and examining message data, which are a response from said central processing unit, and for confirming that said certain device is in a not used state.

5. An operation monitoring and controlling apparatus according to claim 4, wherein said monitoring means further includes means for detecting a user's terminal use demand by means of one of a switch in a keyboard/display device disposed in each of said terminals, a demand switch disposed in proximity to each terminal, and a user detecting sensor disposed in proximity to each terminal.

6. In a computer system including a central processing unit, input/output devices, terminals, and a service processor connected to said central processing unit, an operation monitoring and controlling apparatus comprising:

monitoring means for monitoring a status of use by a user of each of said input/output devices and said terminals; and control means responsive to a result of monitoring provided from said monitoring means for selectively performing one of first and second operations for automatic control of said central processing unit, the first operation including the steps of (1) automatically generating a first command for starting an operating system running in the computer system and (2) supplying the first command to said service processor, and the second operation including the steps of (3) generating automatically a second command for stopping said operation system, and (4) sending the second command to said service processor, wherein the first command is the same as a predetermined command which said service processor needs to receive in order to start the operating system, when power supply to said central processing unit is to be switched on, and the second command is the same as a predetermined command which said service processor needs to receive in order to stop the operating system, when the power supply is switched off;

wherein said control means includes means responsive to a result of monitoring by said monitoring means indicating that none of said input/output devices and said terminals is in use, for examining, before supplying the second command, whether there exists a job either in course of execution in said processing unit or waiting for execution, and wherein the second command is to be supplied by said control means when there does not exist such a job.

7. An operation monitoring and controlling apparatus according to claim 6, wherein said control means further includes means for prohibiting supply of the first and second commands when a timing is not in a saved power operation time zone determined by predetermined schedule information included in said control means.

8. In a computer system including a central processing unit, input/output devices, terminals, and a service processor connected to said central processing unit, an operation monitoring and controlling apparatus comprising:

monitoring means for monitoring a status of use by a user of each of said input/output devices and said terminals; and control means responsive to a result of monitoring provided from said monitoring means for selectively performing one of first and second operations for automatic control of said central processing unit, the first operation including the steps of (1) automatically generating a first command for starting an operating system running in the computer system and (2) supplying the first command to said service processor, and the second operation including the steps of (3) generating automatically a second command for stopping said operation system, and (4) sending the second command to said service processor, wherein the first command is the same as a predetermined command which said service processor needs to receive in order to start the operating system, when power supply to said central processing unit is to be switched on, and the second command is the same as a predetermined command which said service processor needs to receive in order to stop the operating system, when the power supply is switched off;

wherein said control means includes a keyboard input device operable by a user, and means responsive to inputs through said keyboard input device for a manual control of an operation of said central processing unit for sending to said service processor a command inputted by the user which is the same as the first command and a command inputted by the user which is the same as the second command.

9. In a computer system including a processing unit and a plurality of terminal devices connected to the processing unit, wherein in starting use of one of the terminal devices, a power supply for the processing unit is put in an on-state and then processing for initializing an operating system for the processing unit is started, and in terminating use of all of the terminal devices, processing for terminating the operating system is started and then the power supply is put in an off-state, an operation control apparatus comprising:
  (a) a monitor for monitoring whether each of the terminal devices is in a predetermined device state or not, said predetermined device state being at least one of a state where the terminal device is in use and a state where use of the terminal device has been demanded;
  (b) command supply means connected to said monitor for supplying a control command for the processing unit and a control command for the operating system, said command supply means including
    (1) command input means for inputting a control command relating to the processing unit and a control command relating to the operating system by an operator who organizes an operation of the processing unit, and
    (2) command select means connected to said command input means and said monitor for supplying a control command inputted by said command input means when the operator is to control the operation of the processing unit and for supplying one of a first control command relating to the processing unit used to start the initializing processing and a predetermined second control command relating to the operating system used to start the terminating processing in response to an output of said monitor when the operation of the processing unit is to be controlled automatically; and
  (c) command control means connected to said command supply means for executing a control command supplied from said command supply means when the supplied control command is a control command relating to the processing unit, and for supplying the supplied control command to the operating system when the supplied control command is a control command relating to the operating system.

10. An apparatus according to claim 9, wherein said command select means includes means for supplying the first and second control command, respectively, when the power supply is in an off-state and an output of said monitor corresponds to a change of a state of a set of the terminal devices to a first state where at least one of the terminal devices is in the predetermined device state from a second state where none of the terminal devices is in the predetermined device state and when the power supply is in an off-state and the output of said monitor corresponds to a change of the state of the set of the terminal devices to the second state from the first state.

11. An apparatus according to claim 10, wherein said monitor includes:
  a plurality of user detecting sensors provided in one-to-one correspondence with the terminal devices and each disposed in proximity to a corresponding one of the terminal devices; and
  means for determining in response to an output of each of the user detecting sensors whether a terminal device corresponding to the user detecting sensor is in a state where use of the corresponding terminal device is demanded.

12. An apparatus according to claim 10, wherein said monitor includes:
  a plurality of demand switches, provided in one-to-one correspondence to the terminal devices and each disposed in proximity to a corresponding one of the terminal devices, each for inputting a demand for using the corresponding terminal device by a user of the corresponding terminal device; and
  means for determining in response to an output of each of the demand switches whether a terminal device corresponding to the demand switch is in a state where use of the corresponding terminal device is demanded.

13. An apparatus according to claim 10, wherein said monitor includes:
  a plurality of power switches, provided in one-to-one correspondence with the terminal devices and each disposed in proximity to a corresponding terminal device, each for supplying electric power to the corresponding terminal device; and
  means for determining, depending on a state of each of the power switches, whether a terminal device corresponding to the power switch is used or not.

14. An apparatus according to claim 9,
  wherein the computer system further includes a plurality of input/output devices each being operable by a user; and
  wherein said monitor includes means for monitoring whether use of each of the input/output devices is demanded by a user; and
  said command select means includes means for supplying the first control command when the power supply is in an off-state and an output of said monitor corresponds to a change of a state of a set of the terminal devices from a third state to a fourth state, said third state being a state where none of the terminal devices is in the predetermined device state and use is not demanded to any one of the input/output devices, and said fourth state being a state where at least one of the terminal devices is changed in the predetermined state or use has been demanded to at least one of the input/output devices.

15. An apparatus according to claim 14, wherein said command select means further includes means for supplying the second control command when the power supply is in an on-state and the output of said monitor corresponds to a change of the state of the set of the terminal devices from said fourth state to said third state.

16. An apparatus according to claim 9, wherein said command control means comprises a service processor for the processing unit.

17. An apparatus according to claim 9, further including power control means connected to said monitor and being responsive to the output of said monitor for starting the power supply before the first control command is supplied and for preventing the power supply after the terminating processing started by the second control command terminates.

18. In a computer system including a processing unit and a plurality of terminal devices connected to the processing unit, wherein in starting use of one of the terminal devices, a power supply for the processing unit is put in an on-state and then processing for initializing an operating system for the processing unit is started, and in terminating use of all of the terminal devices, processing for terminating the operating system is started and then the power supply is put in an off-state, an operation controlling apparatus, comprising:

(a) a monitor for monitoring whether each of the terminal devices is in a predetermined device state or not, said predetermined device state being at least one of a state where the terminal device is in use and a state where use of the terminal device has been demanded;

(b) a programmed operation control apparatus connected to said monitor for automatically controlling the power supply to the processing unit according to a predetermined computer program, said apparatus being programmed so as to supply a command relating to the processing unit and a command relating to the operating system;

(c) a command control apparatus connected to said operation control apparatus and responsive to a command supplied thereby for executing the supplied command, when the supplied command is a command relating to the processing unit, and for transferring the supplied command to the operating system, when the supplied control program is a command relating to the operating system; and wherein the command relating to the processing unit and the command relating to the operating system respectively include a first command and a second command, one of which is selectively supplied by said operation control apparatus in response to an output of said monitor, the first command requesting the processing unit to start the initializing processing and the second command requesting the operating system to start the terminating processing.

19. An apparatus according to claim 18, wherein said operation control apparatus is programmed to respond to the output of said monitor during a predetermined time period included in a time schedule for an operation of the processing unit.

20. An apparatus according to claim 18, wherein said operation control apparatus is programmed to supply a third command to said command control apparatus as a command relating to the operating system, before supply of the second command, the third command inquiring the operating system about presence of a job which is either under execution by a processing system or waiting for execution thereby; and wherein the second command is supplied when a message from the operating system responding to the third command shows absence of such a job.

21. In a computer system including a processing unit and a plurality of terminal devices connected to the processing unit, an operation control apparatus comprising:

a monitor apparatus connected to the terminal devices for monitoring at least whether each of the terminal devices is in a power-on state or not, for supplying an inquiring command to an operating system for the processing unit when at least one of the terminal devices remains in a power-on state so as to inquire whether the one terminal device is still in use by the operating system, and for generating a power-off command for the one terminal device if a message from the operating system responding to the inquiring command shows that the one terminal device is not in use by the operating system; and a power control apparatus connected to said monitor apparatus and responsive to the power-off command for the one terminal device for selectively stopping power supply to the one terminal device;

wherein the terminal devices are divided into a plurality of groups with each group including plural ones of the terminal devices loaded in one of a plurality distributed locations; and wherein said monitor apparatus includes a plurality of monitor units provided in one-to-one correspondence to the groups and each monitor unit monitors at least whether each of a plurality of terminal devices belonging to one of the groups corresponding to the monitor unit is in a power-on state or not, for supplying an inquiring command to the operating system when at least one of the terminal devices belonging to the corresponding group remains in a power-on state so as to inquire whether the one terminal device is still in use by the operating system, and for generating a power-off command for the one terminal device if a message from the operating system responding to the inquiring command shows that the one terminal device is not in use by the operating system; and wherein said power control apparatus includes a plurality of power control units provided in one-to-one correspondence to the groups and each power control unit is responsive to a power-off command provided by one of the monitor units corresponding to one of the groups corresponding to the power control unit and selectively stops power supply to one terminal device required by a particular power-off command among plural terminal devices belonging to the corresponding group.

22. In a computer system including a processing unit and a plurality of user-operable input-output devices connected to the processing unit, an operation control apparatus comprising:

a monitor apparatus connected to the input/output devices for monitoring whether there has been issued a use request to each of the input/output devices or not, for selectively supplying a power-on command for one of the input/output devices when a user request has been issued to the one input/output device, and for supplying a command to an operating system for the processing unit so as to require the operating system to use the one input/output device; and a power control apparatus connected to said monitor apparatus and responsive to the power-on command for the one input/output device for selectively starting power supply to the one input/output device;

wherein the input/output devices are divided into a plurality of groups with each group including plural ones of the input/output devices located in one of a plurality of distributed locations; and wherein said monitor apparatus includes a plurality of monitor units provided in one-to-one correspondence to the groups and each monitor unit monitors at least whether there has been issued a use request to each of the input/output devices belonging to one of the groups corresponding to the monitor unit, for selectively supplying a power-on command for one of the input/output devices belonging to one of the groups corresponding to the monitor unit when a use request has been issued to one input/output device, and for supplying a command to the operating system so as to request the operating system to use the one input/output device; and wherein said power control apparatus includes a plurality of power control units provided in one-to-one correspondence to the groups and each power control unit is responsive to a power-off command provided by one of the monitor units corresponding to one of the groups corresponding to the power control unit and selectively starts power supply to one input/output device required by a particular power-on command among plural input/output devices belonging to the corresponding group.

23. In a computer system including a processing unit and a plurality of input/output devices each being operable by a user and connected to the processing unit, an operation controlling apparatus comprising:

monitoring means for monitoring whether use of each of the input/output devices is demanded by a user, said monitoring means including means for, when it is supervised that the use of an input/output device is demanded for one of the input/output devices, delivering a command to put a power supply of the one input/output device in an on-state and for delivering to an operating system of the processing unit a previously stared command to demand the operating system to use the one input/output device; and power supply control means for putting the power supply of the one input/output device in an on-state in response to said command;

wherein said monitoring means includes:

a plurality of user detecting sensors provided in one-to-one correspondence to the input/output devices and each disposed in proximity to a corresponding one of the input/output devices; and means for determining in response to an output of each of the user detecting sensors whether the input/output device corresponding to the user detecting sensor is in a state where use of the corresponding input/output device has been demanded.

24. In a computer system including a processing unit and a plurality of input/output devices each being operable by a user and connected to the processing unit, an operation controlling apparatus comprising:

monitoring means for monitoring whether use of each of the input/output devices is demanded by a user, said monitoring means including means for, when it is supervised that the use of an input/output device is demanded for one of the input/output devices, delivering a command to put a power supply of the one input/output device in an on-state and for delivering to an operating system of the processing unit a previously stared command to demand the operating system to use the one input/output device; and power supply control means for putting the power supply of the one input/output device in an on-state in response to said command;

wherein said monitoring means includes:

a plurality of demand switches, provided in one-to-one correspondence to the input/output devices and each disposed in proximity to a corresponding one of the input/output devices, each for inputting a demand to use the corresponding input/output device by a user of the corresponding input/output device; and means for determining in response to an output of each of the demand switches whether an input/output device corresponding to the demand switch is in a state where use of the corresponding input/output device has been demanded.

25. In a computer system including a processing unit and a plurality of terminal devices connected to the processing unit, an operation controlling apparatus comprising:

monitoring means for monitoring whether or not a power supply to each of the terminal devices is in an on-state, said monitoring means including means for, when it is monitored that the power supply of one of the terminal devices is in an on-state, delivering to an operating system of the processing unit a previously stored command for inspecting whether or not the one terminal device is in use by the operating system, and means for determining whether or not the one terminal device is in use by the operating system by inspecting a message which is sent from the operating system in response to said command; and power supply control means for putting the power supply of the one terminal device in an off-state when it is determined by said monitoring means that the one terminal device is not in use by the operating system;

wherein said plurality of terminal devices is divided into plural groups located in distributed locations and each having plural terminal devices; and wherein said monitoring means has a plurality of monitoring units located in a plurality of distributed locations and provided in one-to-one correspondence to said groups, each of said monitoring units including means for monitoring for each terminal device of a corresponding group whether a power supply of the terminal device is in an on-state or not, means for, when it is monitored that a power supply of one of the terminal devices of the corresponding group is in an on-state, delivering to an operating system of the processing unit a previously stored command to inspect whether the one terminal deice of the corresponding group is in use by the operating system or not, and means for determining whether or not the one terminal device of the corresponding group is in use by the operating system by inspecting a message which is sent from the operating system in response to said command; and wherein said power supply control means includes a plurality of power supply control units provided in one-to-one correspondence to said groups, and each of said power supply control units includes means for, when it is determined by a corresponding monitoring unit that one of the terminal devices of the corresponding group is not in use by the operating system even if a power supply of the one terminal device is in an on-state, putting the power supply of the one terminal device in an off-state.

26. In a computer system including a processing unit and a plurality of terminal devices connected to the processing unit, wherein in starting use of one of the terminal devices, a power supply for the processing unit is put in an on-state and then processing for initializing an operating system for the processing unit is started, and in terminating use of all of the terminal devices, processing for terminating the operating system is started and then the power supply is put in an off-state, an operation controlling apparatus comprising:

monitoring means whether each of the terminal devices is in a predetermined device state or not, said predetermined device state being at least one of a state where the terminal device is in use and a state where use of the terminal device is demanded;

command supply means connected to said monitoring means for delivering a command relating to the processing unit and a command relating to the operating system of the processing unit, said command supply means including means responsive to an output of said monitoring means for selectively delivering one of a first command relating to the processing unit requesting start of the initializing processing and a second command relating to the operating system requesting start of the terminating processing; and control means connected to said command supply means for, when a command delivered from said command supply means is a command relating to the processing unit, executing the delivered command, and for, when a command delivered from said command supply means is a command relating to the operating system, supplying the delivered command to the operating system;

said command supply means including means for delivering to said control means, before delivery of the second command, a third command relating to the operating system to ask the operating system whether there is a job either being executed or waiting for execution, and for inspecting a message which is sent from the operating system responding to said third command, wherein the second command is delivered when it is determined from the message that there is no job either being executed or waiting for execution.

27. An apparatus according to claim 26, wherein said monitoring means includes:

a plurality of user detecting sensors provided in one-to-one correspondence to the terminal devices and each disposed in proximity to a corresponding one of the terminal devices; and means for determining in response to an output of each of the user detecting sensors whether a terminal device corresponding to the user detecting sensor is in a state where use of the corresponding terminal device is demanded.

28. An apparatus according to claim 26, wherein said monitoring means includes:

a plurality of demand switches, provided in one-to-one correspondence to the terminal devices and each disposed in proximity to a corresponding one of the terminal devices, each for inputting a demand to use the corresponding terminal device by a user of the corresponding terminal device; and means for determining in response to an output of each of the demand switches whether a terminal device correspond to the demand switch is in a state where use of the corresponding terminal device is demanded.

29. An apparatus according to claim 26, wherein said monitoring means includes:

a plurality of power switches, provided in one-to-one correspondence to the terminal devices and each disposed in proximity to a corresponding one of the terminal devices, each for switching power supply to a corresponding terminal device; and means for determining, depending on a state of each of the power switches, whether or not a terminal device corresponding to the power switch is in use.

30. An apparatus including a processing unit and a plurality of terminal devices connected to the processing unit, wherein in starting use of one of the terminal devices, a power supply for the processing unit is put in an on-state and then processing for initializing an operating system for the processing unit is started, and in terminating use of all of the terminal devices, processing for terminating the operating system is started and then the power supply is put in an off-state, an operation controlling apparatus comprising:

monitoring means for monitoring whether each of the terminal devices is in a predetermined device state or not, said predetermined device state being at least one of state where the terminal device is in use and a state where use of the terminal device is demanded; and control means for controlling a power supply to the processing unit in accordance with a combination of a predetermined time zone and a result of monitoring by said monitoring means, said control means including means for putting the power supply to the processing unit in an off-state, when a state of a set of the terminal devices has changed during the time one from a first state where one of the terminal devices is in said predetermined device state to a second state where none of the terminal devices is in said predetermined device state, and means for putting the power supply to the processing unit in an on-state when the state of the set of the terminal devices has changed during the time zone from the second state to the first state;

wherein said monitoring means includes:

a plurality of user detecting sensors provided in one-to-one correspondence to the terminal devices and each disposed in proximity to a corresponding one of the terminal devices; and means for determining in response to an output of each of the user detecting sensors whether a terminal device corresponding to the user detecting sensor is in a state where use of the corresponding terminal device is demanded.

31. An apparatus including a processing unit and a plurality of terminal devices connected to the processing unit, wherein in starting use of one of the terminal devices, a power supply for the processing unit is put in an on-state and then processing for initializing an operating system for the processing unit is started, and in terminating use of all of the terminal devices, processing for terminating the operating system is started and then the power supply is put in an off-state, an operation controlling apparatus comprising:

monitoring means for monitoring whether each of the terminal devices is in a predetermined device state or not, said predetermined device state being at least one of a state where the terminal device is in use and a state where use of the terminal device is demanded; and control means for controlling a power supply to the processing unit in accordance with a combination of a predetermined time zone and a result of monitoring by said monitoring means, said control means including means for putting the power supply to the processing unit in an off-state, when a state of a set of the terminal devices has changed during the time one from a first state where one of the terminal devices is in said predetermined device state to a second state where none of the terminal devices is in said predetermined device state, and means for putting the power supply to the processing unit in an on-state when the state of the set of the terminal devices has changed during the time zone from the second state to the first state;

wherein said monitoring means includes:
- a plurality of demand switches, provided in one-to-one correspondence to the terminal devices and each disposed in proximity to a corresponding one of the terminal devices, each for inputting a demand for using a corresponding terminal device by a user of the corresponding terminal device; and
- means for determining in response to an output of each of the demand switches whether a terminal device corresponding to the demand switch is in a state where use of the corresponding terminal device is demanded.

32. An apparatus including a processing unit and a plurality of terminal devices connected to the processing unit, wherein in starting use of one of the terminal devices, a power supply for the processing unit is put in an on-state and then processing for initializing an operating system for the processing unit is started, and in terminating use of all of the terminal devices, processing for terminating the operating system is started and then the power supply is put in an off-state, an operation controlling apparatus comprising:

monitoring means for monitoring whether each of the terminal devices is in a predetermined device state or not, said predetermined device state being at least one of a state where the terminal device is in use and a state where use of the terminal device is demanded; and control means for controlling a power supply to the processing unit in accordance with a combination of a predetermined time zone and a result of monitoring by said monitoring means, said control means including means for putting the power supply to the processing unit in an off-state, when a state of a set of the terminal devices has changed during the time one from a first state where one of the terminal devices is in said predetermined device state to a second state where none of the terminal devices is in said predetermined device state, and means for putting the power supply to the processing unit in an on-state when the state of the set of the terminal devices has changed during the time zone from the second state to the first state;

wherein said monitoring means includes:
- a plurality of power switches, provided in one-to-one correspondence to the terminal devices and each disposed in proximity to a corresponding one of the terminal devices, each for switching supply of electric power to the corresponding terminal device; and
- means for determining, depending on a state of each of the power switches, whether a terminal device corresponding to the power switch is in use or not.

* * * * *